United States Patent
Oishi et al.

(10) Patent No.: US 7,633,964 B2
(45) Date of Patent: Dec. 15, 2009

(54) COMMUNICATION APPARATUS, COMMUNICATION SYSTEM AND COMMUNICATION METHOD

(75) Inventors: Mutsuhiko Oishi, Fukuoka (JP); Tsunehiro Hanada, Fukuoka (JP); Fumio Ichihara, Fukuoka (JP); Akihiro Yamashita, Saga (JP); Masahiro Maki, Fukuoka (JP); Toshiyuki Wakisaka, Fukuoka (JP)

(73) Assignee: Panasonic Corporation, Osaka (JP)

( * ) Notice: Subject to any disclaimer, the term of this patent is extended or adjusted under 35 U.S.C. 154(b) by 479 days.

(21) Appl. No.: 10/574,950

(22) PCT Filed: May 27, 2005

(86) PCT No.: PCT/JP2005/010200

§ 371 (c)(1),
(2), (4) Date: Apr. 7, 2006

(87) PCT Pub. No.: WO2005/117384

PCT Pub. Date: Dec. 8, 2005

(65) Prior Publication Data

US 2007/0081551 A1    Apr. 12, 2007

(30) Foreign Application Priority Data

May 27, 2004    (JP) .............................. 2004-157240

(51) Int. Cl.
*H04L 12/66* (2006.01)
(52) U.S. Cl. .................. 370/463; 370/208; 370/278; 370/282; 370/431; 379/399.01; 340/500; 340/540; 340/541; 340/561; 340/600; 455/13.4; 455/522

(58) Field of Classification Search ................. 370/463, 370/431, 208, 278, 282; 379/399.01; 340/600, 340/540, 500, 561, 541; 455/13.4, 522
See application file for complete search history.

(56) References Cited

U.S. PATENT DOCUMENTS 4,679,227 A    7/1987    Hughes-Hartogs (Continued)

FOREIGN PATENT DOCUMENTS

JP    2003152671    5/2003

(Continued)

OTHER PUBLICATIONS

PCT International Search Report dated Nov. 23, 2005.

(Continued)

*Primary Examiner*—Ricky Ngo
*Assistant Examiner*—Luat Phung
(74) *Attorney, Agent, or Firm*—Dickinson Wright PLLC

(57) ABSTRACT

It is an object of the invention to provide a communication apparatus, a communication system and a communication method enabling efficient transmission in accordance with a situation of a wired transmission line and capable of reducing an influence by a radiation power of the transmission line. The communication apparatus of the invention executes wired transmission using a plurality of sub carriers and includes a transmission signal generator for generating a transmission signal, and a transmission signal controller for controlling a transmission power of the transmission signal generated by the transmission signal generator based on a radiation power in a transmission line in correspondence with a frequency of the sub carrier, and a transmitter for transmitting the transmission signal the transmission power of which is controlled by the transmission signal controller via the transmission line.

25 Claims, 15 Drawing Sheets

U.S. PATENT DOCUMENTS

| | | | |
|---|---|---|---|
| 5,018,165 A * | 5/1991 | Sohner et al. | 375/133 |
| 5,832,387 A * | 11/1998 | Bae et al. | 455/522 |
| 5,991,269 A * | 11/1999 | Williamson et al. | 370/241 |
| 6,407,987 B1 * | 6/2002 | Abraham | 370/295 |
| 6,487,394 B1 * | 11/2002 | Ue et al. | 455/69 |
| 7,023,324 B2 | 4/2006 | Kodama et al. | |
| 7,133,441 B1 * | 11/2006 | Barlev et al. | 375/222 |
| 2001/0055319 A1 * | 12/2001 | Quigley et al. | 370/480 |
| 2003/0156014 A1 * | 8/2003 | Kodama et al. | 340/310.01 |
| 2003/0206160 A1 * | 11/2003 | Ikami | 345/173 |
| 2004/0109499 A1 * | 6/2004 | Cern | 375/222 |
| 2004/0131123 A1 | 7/2004 | Maki et al. | |

FOREIGN PATENT DOCUMENTS

| | | |
|---|---|---|
| JP | 2003218831 | 7/2003 |
| JP | 2004080441 | 3/2004 |
| WO | 03/061153 | 7/2003 |
| WO | 2005029803 | 3/2005 |

OTHER PUBLICATIONS

European Search Report under Rule 112 EPC dated Oct. 29, 2007.

B. Hirosaki, et al, "A 19.2 KBPS Voiceband Data Modem Based on Orthogonally Multiplexed QAM Techniques," Internation Conference on Communications, Chicago, Jun. 23-26, 1985, New York, IEEE, US, vol. 2, Jun. 23, 1985, pp. 661-665.

P. Chow, et al., "A Practical Discrete Multitone Transceiver Loading Algorithm For Data Transmission Over Spectrally Shaped Channels," IEEE Transactions on Communications, IEEE Service Center, Piscataway, NJ, US, vol. 43, No. 2/4, Part 2, Feb. 1, 1995, pp. 773-775.

R. Stolle, "Electromagnetic Coupling of Twisted Air Cables," IEEE Jopurnal on Selected Areas in Communications, IEEE Inc. New Your, US, Jun. 2002, pp. 883-892.

* cited by examiner

COMMUNICATION APPARATUS, COMMUNICATION SYSTEM AND COMMUNICATION METHOD

TECHNICAL FIELD

The present invention relaters to a communication apparatus, a communication system, and a communication method for executing wired transmission using a plurality of sub carriers.

BACKGROUND

A transmission system using a plurality of sub carriers of an OFDM (orthogonal frequency division multiplexing) system or the like is utilized not only in wireless communication but also in wired communication. Although a transmission system using a plurality of sub carriers achieves a significant advantage that high quality communication can be executed even in a severe transmission path, depending on a quality of a transmission path, there is a case in which a radiation power is increased to effect an influence on outside.

According to communication of the OFDM system, a transmission power is controlled and a modulating system is selected for respective carriers on a transmission side based on a result of measuring power on a receiving side (refer to JP-A-2003-152671, JP-A-2003-218831) As shown by JP-A-2003-152671, in multi carrier wireless communication, it is ordinarily carried out to inform a received power value of a sub carrier detected on the receiving side to the transmission side and control a transmission power of the sub carrier on the transmission side receiving the received power value. Further, JP-A-2003-218831 describes a technology of selecting a sub carrier used in accordance with a situation of a communication error detected on the receiving side in the wired transmission of the OFDM system.

However, in either of the technologies shown in JP-A-2003-152671, JP-A-2003-218831, a transmission signal is controlled by utilizing a result of processing the receiving signal on the receiving side and the system is not simply constructed. Further, the influence of the radiation power cannot necessarily be reduced.

SUMMARY

An object of the invention is to provide a communication apparatus, a communication system and a communication method enabling efficient transmission in accordance with a situation of a wired transmission line and capable of reducing an influence by a radiation power of the transmission line.

A communication apparatus of the invention executes wired transmission using a plurality of sub carriers and includes a transmission signal generator for generating a transmission signal, and a transmission signal controller for controlling a transmission power of the transmission signal generated by the transmission signal generator based on a radiation power in a transmission line in correspondence with a frequency of the sub carrier, and a transmitter for transmitting the transmission signal the transmission power of which is controlled by the transmission signal controller via the transmission line.

The communication apparatus of the invention includes the communication apparatus wherein the transmission signal controller reduces the transmission power of the sub carrier of the frequency in which the radiation power exceeds a predetermined value.

The communication apparatus of the invention includes the communication apparatus wherein the transmission signal controller nullifies the transmission power of the sub carrier of the frequency in which the radiation power exceeds the predetermined value.

The communication apparatus of the invention includes the communication apparatus wherein the transmission signal controller reduces the transmission power of the sub carrier of the frequency in which the radiation power exceeds the predetermined value until the radiation power becomes equal to or lower than the predetermined value.

According to the invention, efficient transmission in accordance with a state of a wired transmission can be executed and an influence by the radiation power of the transmission line can be reduced.

The communication apparatus of the invention includes the communication apparatus wherein the transmission signal controller increases the transmission power of the sub carrier of the frequency in which the radiation power is equal to or lower than the predetermined value. According to the invention, by relatively increasing a transmission power of a carrier having a small radiation power, a reduction in a communication rate as a whole can be avoided.

The communication apparatus of the invention includes the communication apparatus wherein the transmission signal controller intermittently changes the sub carrier of the frequency in which the radiation power exceeds the predetermined value. According to the invention, a reduction in an average radiation power can be realized.

The communication apparatus of the invention includes the communication apparatus wherein the transmission signal controller selects a modulation system of the sub carrier based on a radiation power signal from the transmission line.

The communication apparatus of the invention includes the communication apparatus wherein the transmission signal controller changes the modulation system of the sub carrier of the frequency in which the radiation power exceeds the predetermined value to a modulation system having a relatively low communication rate.

The communication apparatus of the invention includes the communication apparatus comprising a radiation power detector for directly detecting the radiation power.

The communication apparatus of the invention includes the communication apparatus wherein the wired transmission utilizes a pair of lines, further comprising a radiation power detector for indirectly detecting a signal of the radiation power by utilizing signals transmitted through the pair of lines.

The communication apparatus of the invention includes the communication apparatus wherein the radiation power detector detects an unbalance component of the signals transmitted through the pair of lines.

The communication apparatus of the invention includes the communication apparatus comprising a radiation power transmitter for transmitting the detected radiation power signal indicating the radiation power to other communication apparatus. According to the invention, it is not necessary to provide the radiation power detector to all of communication apparatus and a communication system can be constructed by utilizing the communication apparatus having a simple structure.

The communication apparatus of the invention includes the communication apparatus comprising a power control signal transmitter for transmitting a power control signal calculated based on the detected radiation power signal for controlling the transmission power of the sub carrier to other communication apparatus. When a communication system is constituted by including the communication apparatus of the invention, transmission reducing the influence by the radiation power of the transmission line can be executed even when other communication apparatus is not provided with the radiation power detector or the power control signal transmitter for transmitting the power control signal for controlling the transmission power of the sub carrier based on the radiation power signal.

The communication apparatus of the invention comprises a radiation power receiver for receiving a radiation power signal indicating a radiation power from outside.

The communication apparatus of the invention includes the communication apparatus wherein the transmission signal controller intermittently makes the transmission powers of all of the sub carriers constant and utilizes the radiation power signal at that occasion for controlling the transmission signal.

The communication apparatus of the invention includes the communication apparatus wherein the radiation power signal indicating the radiation power is acquired only once in starting communication.

The communication apparatus of the invention includes the communication apparatus wherein the radiation power signal indicating the radiation power is acquired periodically.

The communication apparatus of the invention includes the communication apparatus wherein the transmission line is a power line.

The communication apparatus of the invention includes the communication apparatus wherein the wired transmission is transmission of an OFDM system.

The communication apparatus of the invention includes the communication apparatus wherein the wired transmission is the transmission of the OFDM system using a wavelet transformation. According to the invention, a side lobe of each sub carrier is low and therefore, control of carriers for respective carriers can simply be executed and power control for respective sub carriers can simply be executed.

A communication system of the invention is a communication system comprising a plurality of communication apparatus connected via a wired transmission line, wherein one communication apparatus of the plurality of communication apparatus is the communication apparatus according to claim 18 for transmitting the detected radiation power signal indicating the radiation power to all of remaining communication apparatus of the plurality of communication apparatus, and wherein the remaining communication apparatus are the communication apparatus according to claim 20 for controlling the transmission power of the sub carrier based on the radiation power signal received from the one communication apparatus.

A communication system of the invention is a communication system comprising a plurality of communication apparatus connected via a wired transmission line, wherein one communication apparatus of the plurality of communication apparatus is the communication apparatus including means for transmitting the detected radiation power to other communication apparatus for transmitting the power control signal to all of remaining communication apparatus of the plurality of communication apparatus, and the remaining communication apparatus control the transmission power of the sub carrier based on the transmission power control signal received from the one communication apparatus.

A communication method of the invention is a communication method for executing a wired transmission by using a plurality of sub carriers, comprising generating a transmission signal, controlling a transmission power of the generated transmission signal based on a radiation power in a transmission line in correspondence with a frequency of the sub carrier, and transmitting a transmission signal the transmission power of which is controlled via the transmission line.

As is apparent from the above-described explanation, according to the invention, the communication apparatus, the communication system, and the communication method enabling efficient transmission in accordance with the state of the wired transmission line and capable of reducing the influence by the radiation power of the transmission line can be provided.

DETAILED DESCRIPTION

An embodiment of the invention will be explained in reference to the drawings as follows.

FIRST EMBODIMENT

Figure 1:
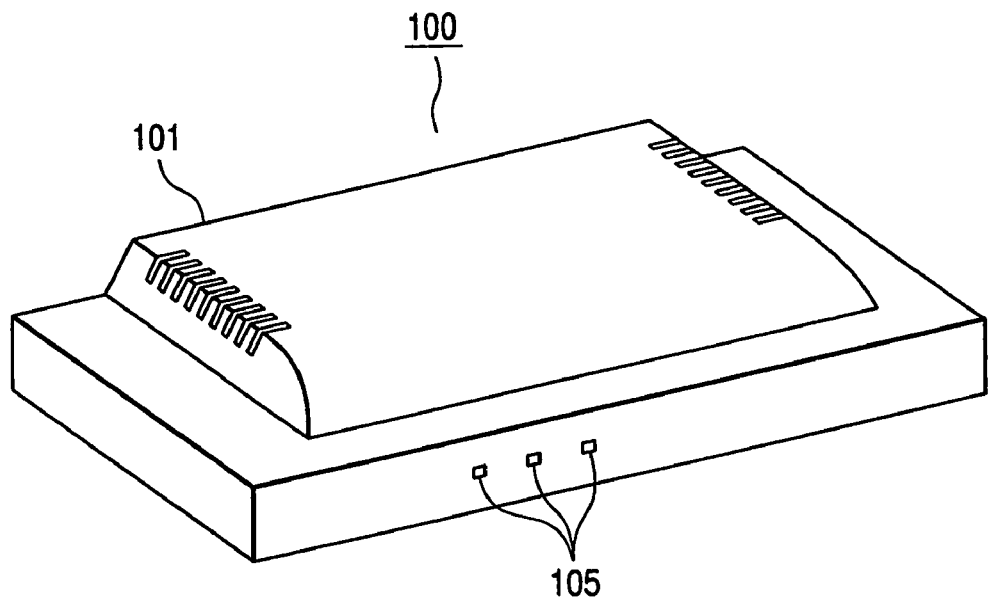
FIG. 1 is a perspective view of an outlook showing a front face of a communication apparatus.
Figure 2:
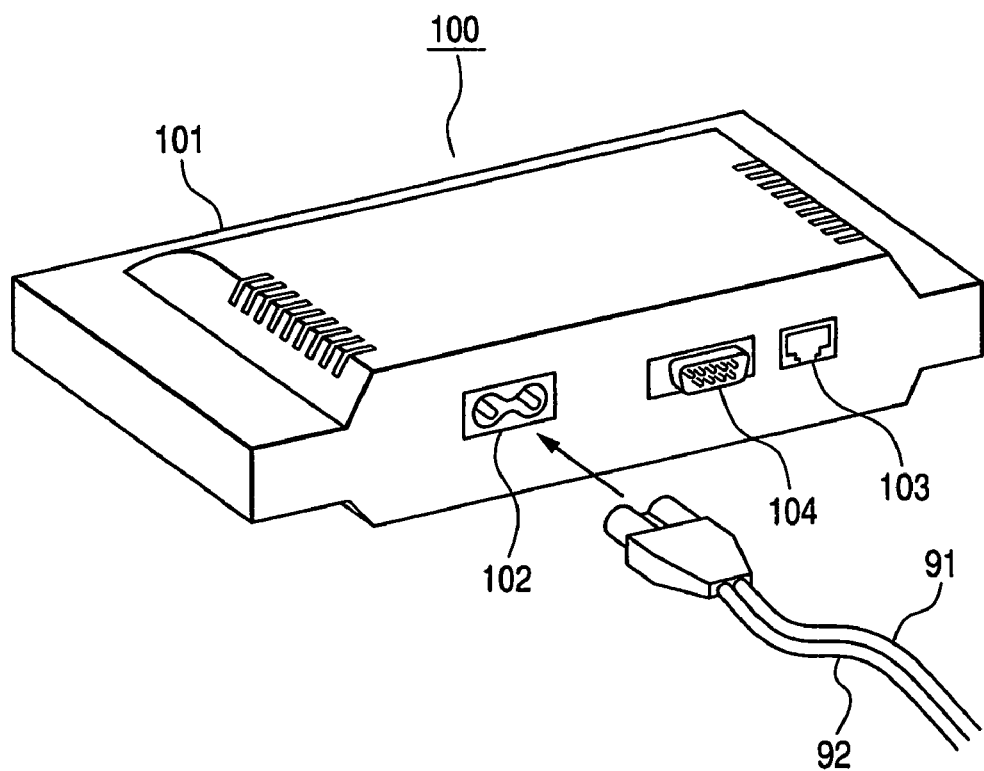
FIG. 2 is a perspective view of an outlook showing a rear face of the communication apparatus.

FIG. 1 is a perspective view of an outlook showing a front face of a communication apparatus, and FIG. 2 is a perspective view of an outlook showing a rear face of the communication apparatus. A communication apparatus 100 according to the embodiment is a modem as shown by FIG. 1 and FIG. 2. The communication apparatus 100 includes a cabinet 101. A front face of the cabinet 101 is provided with a display portion 105 of LED (Light Emitting Diode) or the like as shown by FIG. 1. The rear face of the cabinet 101 is provided with a power connector 102, a modular jack 103 for LAN (Local Area Network) of RJ45 or the like, and a Dsub connector 104. The power connector 102 is connected with a pair of lines 91, 92 of parallel cables or the like as shown by FIG. 2. The modular jack 103 is connected with an LAN cable, not illustrated. The Dsub connector 104 is connected with a Dsub cable, not illustrated. Further, although the modem of FIG. 1 and FIG. 2 is shown as an example of a communication apparatus, the communication apparatus is not particularly limited thereto but the communication apparatus may be an electric apparatus (for example, household electric appliance of television set or the like) having a modem.

Figure 3:
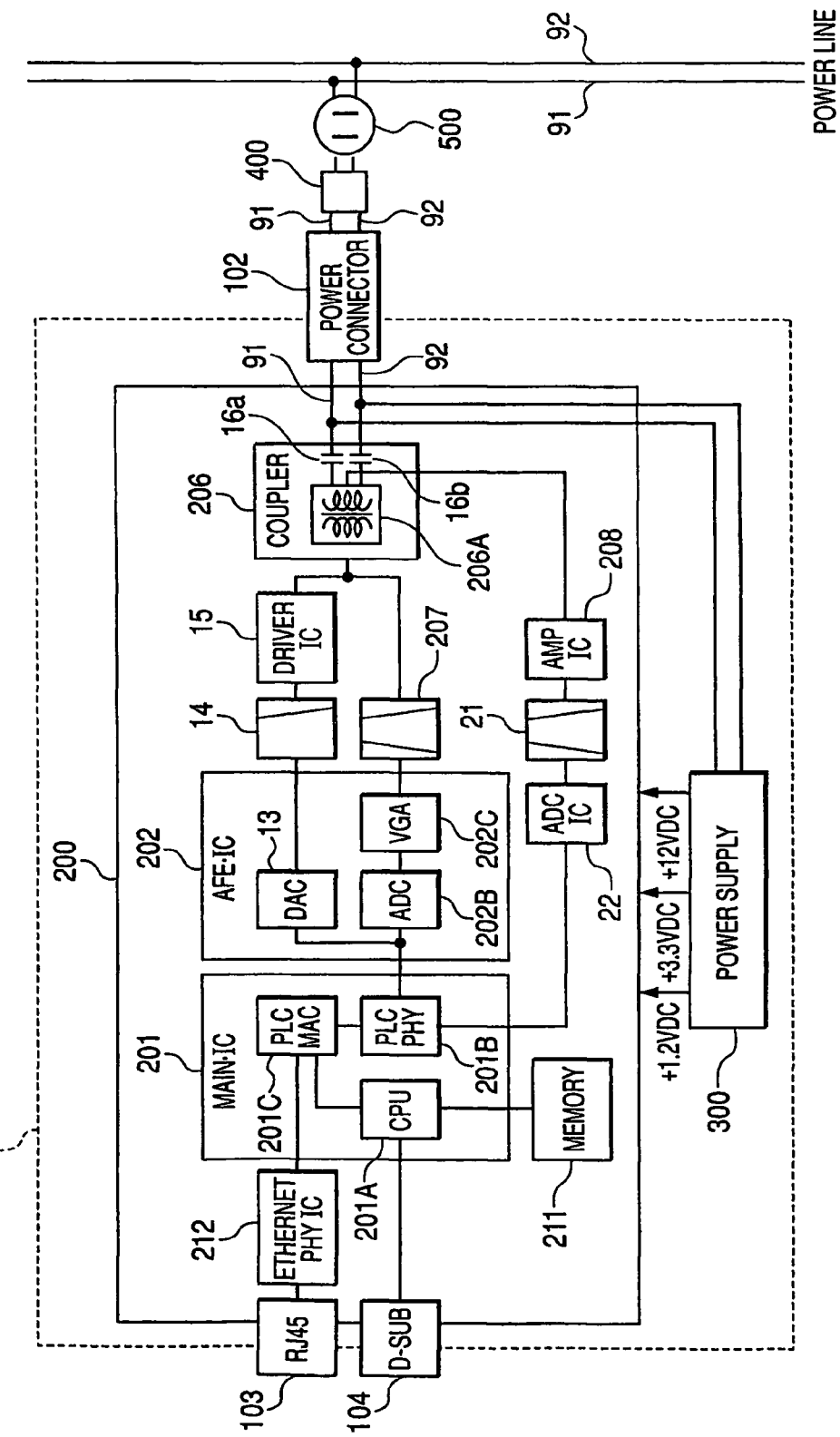
FIG. 3 is a block diagram showing an example of a hardware of the communication apparatus.

FIG. 3 is a block diagram showing an example of a hardware of the communication apparatus. As shown by FIG. 3, the communication apparatus 100 includes a circuit module 200 and a power supply 300. The power supply 300 supplies various voltages (for example, +1.2V, +3.3V, +12V) to the circuit module 200. The circuit module 200 is provided with a main IC (Integrated Circuit) 201, AFE•IC (Analog Front End IC) 202, a low pass filter 14, a driver IC 15, a coupler 206, a band pass filter 207, AMP (amplifier)•IC 208, a band pass filter 21, ADC (AD conversion)•IC 22, a memory 211, and an ethernet PHY (Physical layer)•IC 212. The power connector 102 is connected to power lines constituting the pair of lines 91, 92 via a plug 400 and a plug socket 500.

The main IC 201 is constituted by CPU (Central Processing Unit) 201A, PLC•MAC (Power line Communication•Media Access Control Layer) block 201C, and PLC•PHY (Power Line Communication•Physical layer) block 201B. CPU 201A is mounted with an RISC (Reduced Instruction Set Computer) processor of 32 bits. PLC•MAC block 201C controls an MAC layer of a transmission signal, and PLC•PHY block 201B controls a PHY layer of a transmission signal. AFC•IC 202 is constituted by a DA converter (DAC) 13, an AD converter (ADC) 202B, and a variable gain amplifier (VGA) 202C. The coupler 206 is constituted by a coil transformer 206A, and coupling capacitors 16a, 16b.

Figure 5:
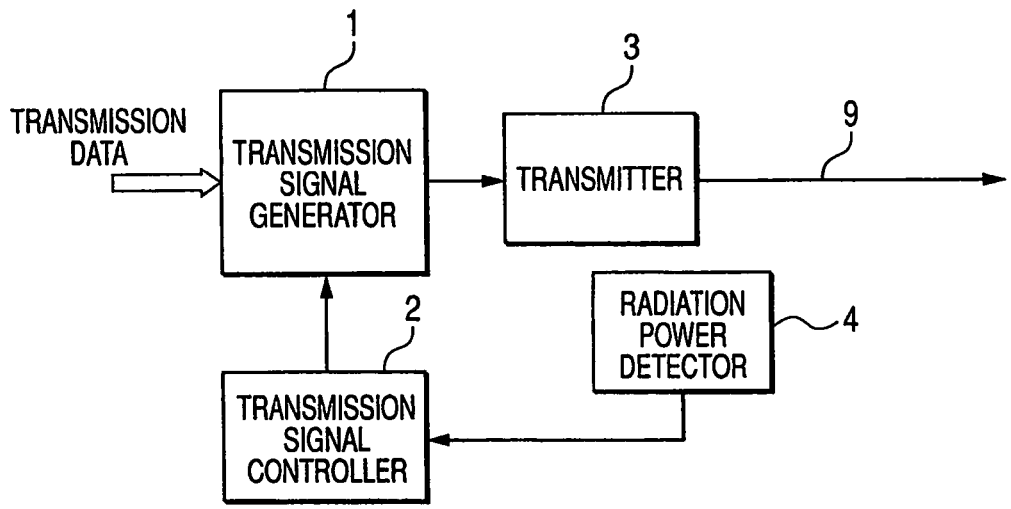
FIG. 5 is a diagram showing an outline structure of an example of a communication apparatus for explaining a first embodiment of the invention.

FIG. 5 shows an outline structure of an example of a communication apparatus for explaining a first embodiment of the invention. The communication apparatus of FIG. 5 is constituted by including a transmission signal generator 1, a transmission signal controller 2, a transmitter 3, and a radiation power detector 4. The transmission signal generator 1 generates a transmission signal for executing transmission using a plurality of sub carriers (multi carrier transmission signal) under control of the transmission signal controller 2 and is provided with a transmission power control function for respective sub carriers. A transmission system using a plurality of sub carriers is, for example, an OFDM system utilizing wavelet transformation as shown by JP-A-2003-218831.

Further, the transmission signal generator 1 and the transmission signal controller 2 correspond to PLC•PHY block 201B of the main IC 201 and AFE•IC 202 shown in FIG. 3. The transmitter 3 corresponds to the low pass filter 14, the driver IC 15 and the coupler 206 shown in FIG. 3. The radiation power detector 4 corresponds to AMP•IC 208, the band pass filter 21, and ADC•IC 22 shown in FIG. 3.

When utilizing the OFDM system utilizing wavelet transformation, the transmission signal generator 1 maps a plurality of bit rows to signal points (for example, amplitude) of the respective carriers from transmission data, executes wavelet inverse transformation based on mapped signal point data of the respective sub carriers and converts time domain sequential data subjected to wavelet inverse transformation into analog signal to generate a transmission signal. At this occasion, modulating systems for respective sub carriers and transmission power are set by a control signal from the transmission signal controller 2.

The transmission signal controller 2 controls a transmission signal generating processing including control of transmission power of the respective sub carriers and selection of the modulating systems, mentioned later. The transmitter 3 outputs the transmission signal from the transmission signal generator 1 to a transmission line 9 and also executes a gain control of a total of the transmission signal or the like.

Figure 4:
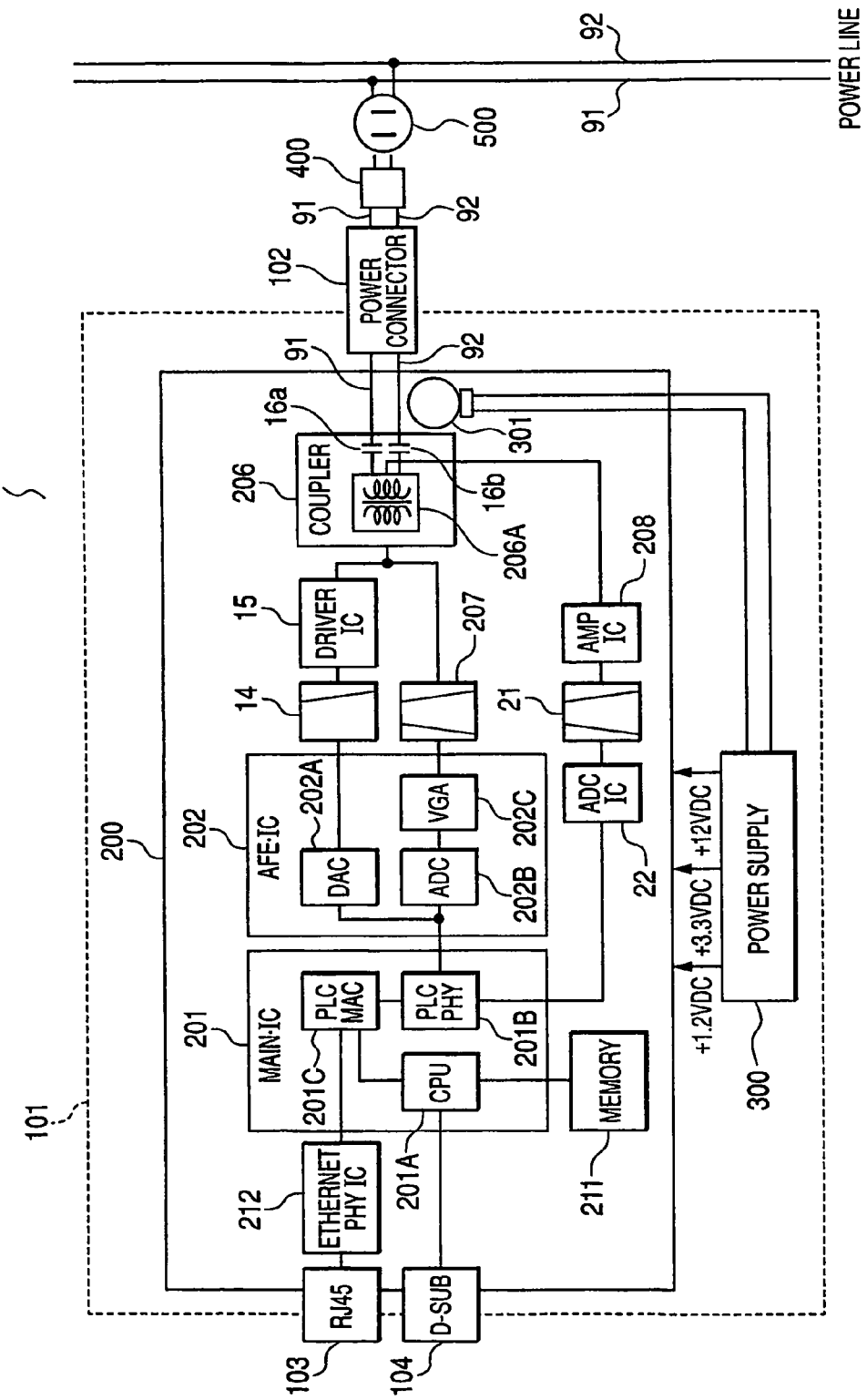
FIG. 4 is a block diagram showing a modified example of a hardware of a communication apparatus.

The radiation power detector 4 directly detects power of transmission power radiated from the transmission lines 91, 92. FIG. 4 is a block diagram showing a modified example of the hardware of the communication apparatus. As shown by FIG. 4, the radiation power detector 4 is provided with a loop antenna 301 arranged at a vicinity of the transmission lines 91, 92 as an example, and outputs a radiation power signal in correspondence with a sub carrier frequency of the transmission signal from a signal detected by the loop antenna 301. The loop antenna 301 may be provided at an inner portion of the cabinet 101 of the communication apparatus, or may be provided separately. Further, an induction coil can also be utilized in place of the loop antenna 301. In this case, the radiation power detector 4 corresponds to the loop antenna 301, AMP•IC 208, the band pass filter 21, and ADC•IC22 shown in FIG. 4.

Figure 6:
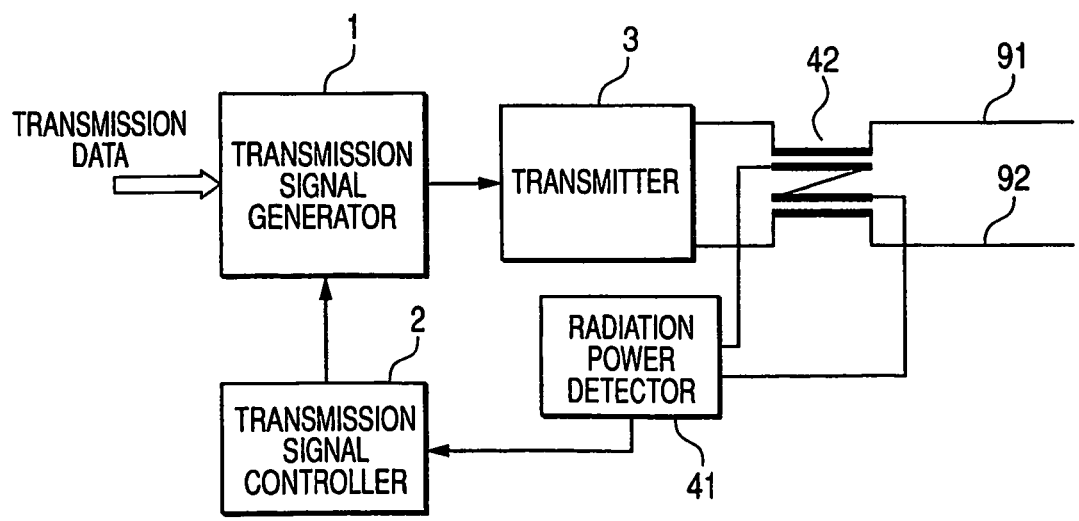
FIG. 6 is a view showing an outline structure of other example of the communication apparatus for explaining the first embodiment of the invention.

FIG. 6 shows an outline structure of other example of a communication apparatus for explaining an embodiment of the invention. The communication apparatus of FIG. 6 is the same as the communication apparatus of FIG. 1 except that a radiation power is indirectly detected by utilizing signals transmitted by a pair of transmission lines. Elements attached with the same numerals stay the same and therefore, an explanation thereof will be omitted.

A pair of transmission lines 91, 92 are connected in series with current transformers 42 and secondary windings of the current transformers 42 are connected in series. When the secondary windings of the current transformers 42 are connected to detect currents of the same direction of the transmission lines 91, 92 as shown by FIG. 6, the secondary winding currents indicate an unbalance component in correspondence with radiation powers from the transmission lines 91, 92. A radiation power detector 41 of FIG. 6 outputs a radiation power signal in correspondence with a sub carrier frequency of a transmission signal based on the secondary winding currents of the current transformers 42.

Figure 7:
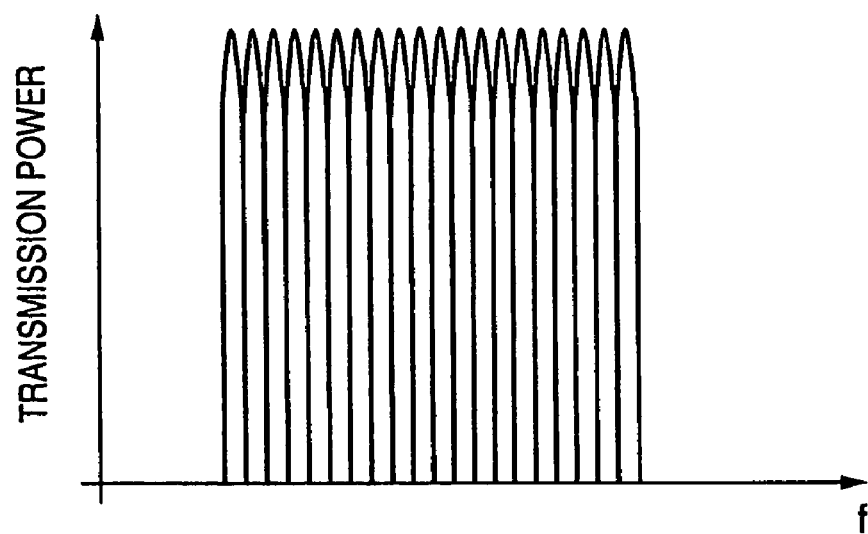
FIG. 7 is a frequency spectrum diagram of a transmission signal when transmission powers of respective sub carriers are made constant.
Figure 8:
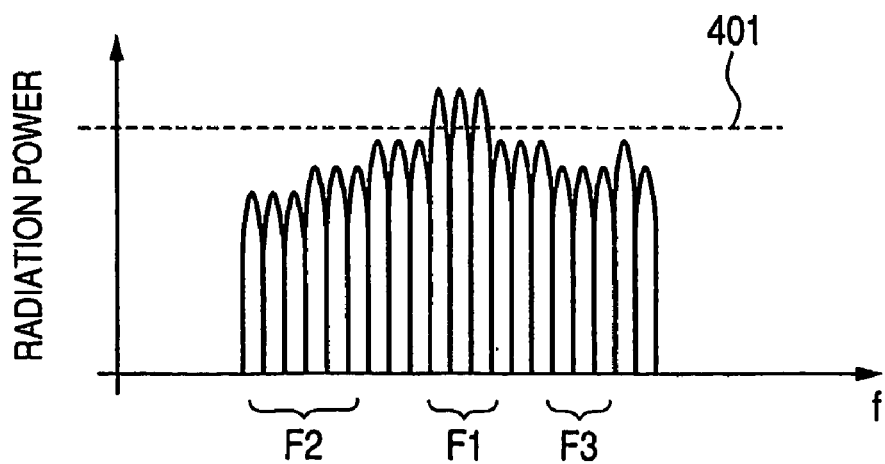
FIG. 8 shows an example of a frequency spectrum of a radiation power.

Next, a transmission power control of the communication apparatus shown in FIG. 5, FIG. 6 will be explained. Assume that a transmission signal for making transmission powers of respective sub carriers constant is outputted from the transmission generator 1. FIG. 7 is a frequency spectrum diagram of the transmission signal in this case. Even when such a transmission signal is outputted, radiation is brought about by a frequency characteristic in accordance with states of the transmission lines 9, 91, 92 or the like. FIG. 8 shows an example of a frequency spectrum of a radiation power. In the example of FIG. 8, a sub carrier of a frequency band F1 exceeds a predetermined threshold 401. The transmission signal controller 2 controls a transmission power of the sub carrier by controlling operation of the transmission signal generator 1 based on a radiation power signal as shown by FIG. 8 inputted from the radiation power detector 4, 41.

Figure 9:
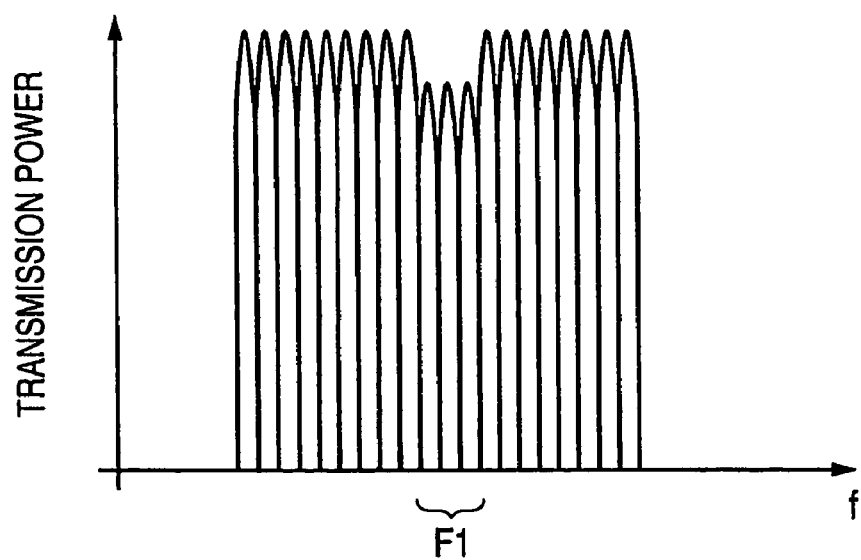
FIG. 9 is a diagram showing an example of a frequency spectrum of a transmission signal in which a transmission power of a transmission apparatus of an embodiment of the invention is controlled.

According an example of a control of the transmission power of the sub carrier, a transmission power of the sub carrier having the frequency in which the radiation power exceeds the predetermined value is reduced. FIG. 9 shows a frequency spectrum of the transmission signal in which the transmission power is controlled. In the example of FIG. 9, the transmission power of the sub carrier of the frequency band F1 in which the radiation power exceeds the predetermined threshold 401 is reduced by a small amount. The amount to be reduced may previously be determined or may be controlled in accordance with a deviation from the threshold 401.

Figure 10:
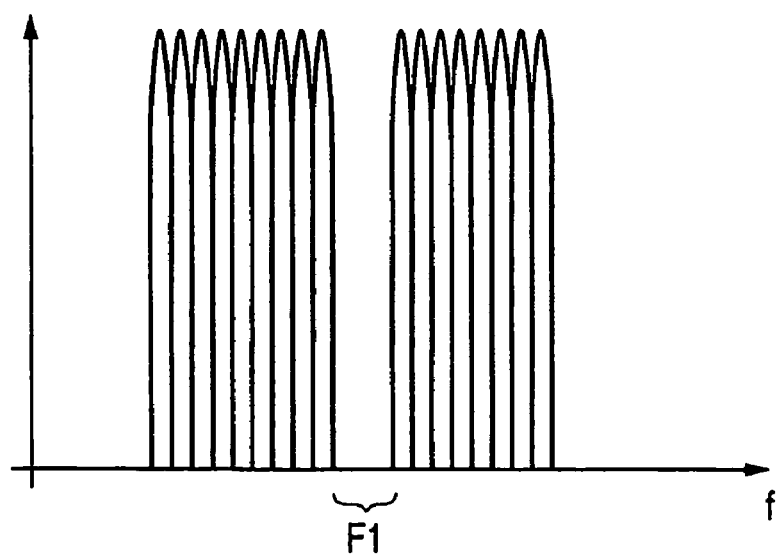
FIG. 10 is a diagram showing other example of a frequency spectrum of a transmission signal in which a transmission power of a transmission apparatus of an embodiment of the invention is controlled.

A number of times of reducing the transmission power is not limited to once but the transmission power may be reduced by a plurality of times until the radiation power becomes equal to or lower than the threshold 401. Further, the transmission power of the sub carrier of the frequency band F1 in which the radiation power exceeds the predetermined threshold 401 may be nullified. FIG. 10 shows a frequency spectrum of the transmission signal in this case. Further, nullifying the transmission power of a specific sub carrier signifies that the sub carrier is not used.

Although in the above-described explanation, the transmission power of the sub carrier of the frequency band F1 in which the radiation power exceeds the predetermined threshold 401 is made to stay to be changed, the transmission power may intermittently be changed. For example, the transmission power of the sub carrier at the frequency band F1 is reduced by a constant period of time as shown by FIG. 9 or FIG. 10, successively, the transmission power is transmitted as a constant transmission power as shown by FIG. 7 at other period of time. In this case, when the transmission power is transmitted by a constant transmission power for all of sub carriers, although the radiation power exceeds the threshold 401 only by a constant period of time, an average radiation power can be reduced and therefore, the radiation power can be reduced without significantly reducing a transmission efficiency.

Figure 11:
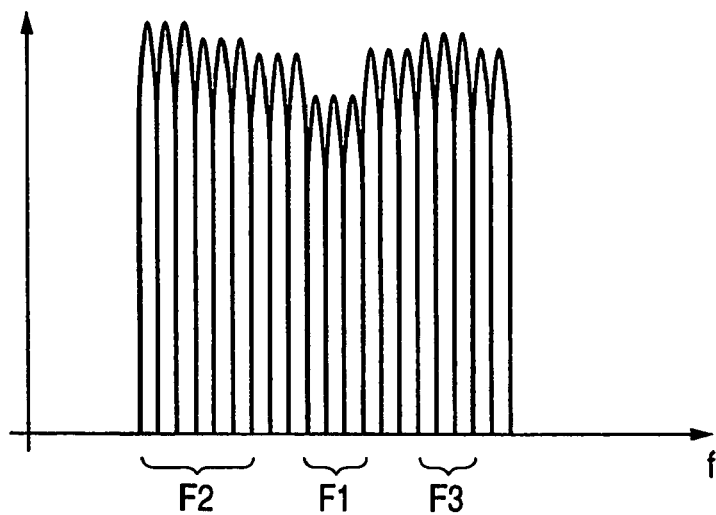
FIG. 11 is a diagram showing still other example of a frequency spectrum of a transmission signal in which a transmission power in a transmission apparatus of an embodiment of the invention is controlled.

Although according to the examples of FIG. 9, FIG. 10, an explanation has been given of the case of reducing the transmission power of the sub carrier at the frequency band F1 in which the radiation power exceeds the predetermined threshold 401, with regard to a sub carrier at a band in which the radiation power does not exceed the threshold 401, the transmission power may be increased. FIG. 11 shows a frequency spectrum of a transmission signal in this case. In the example of FIG. 11 transmission powers of sub carriers at frequency bands F2, F3 in which radiation powers are sufficiently lower than the threshold 401 are increased. With regard to the sub carrier at frequency band F1, the transmission power is reduced similar to the example of FIG. 9.

As has been explained above, according to the communication apparatus of the first embodiment, the radiation power can be reduced only by detection and control on a transmission side and therefore, it is not necessary to communicate with other apparatus for reducing radiation power and control of a communication system is simplified.

Next, a timing of a transmission power control will be explained. In detecting radiation power, transmission is executed by making transmission powers of all sub carriers constant intermittently and radiation powers at that occasion are detected by the radiation power detector 4, 41. Further, the radiation power signal provided by detection is utilized in the transmission power control of communication thereafter. When transmission is executed by making the transmission powers of all the sub carriers constant, although as transmission data, normally transmitted data may be utilized, a previously determined predetermined data may be transmitted.

Figure 12:
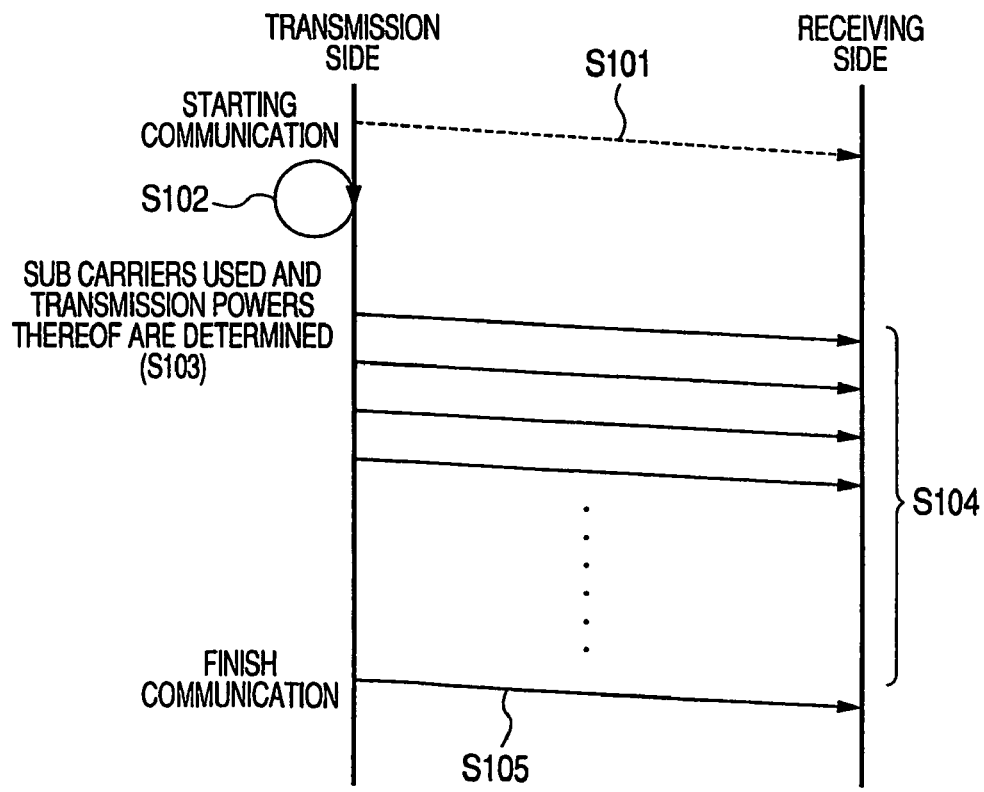
FIG. 12 is a time chart when a radiation power is detected only once in starting communication.

The radiation power may be detected only once in starting communication, or may be detected periodically at predetermined intervals in communication. FIG. 12 shows a time chart when the radiation power is detected only once in starting communication. A communication apparatus on a transmission side as shown by FIG. 5, FIG. 6 transmits a test frame for detecting a radiation power for a constant period of time in starting communication (S101). The test frame transmits normally transmitted data or predetermined data by making transmission powers of all the sub carriers constant. Further, a radiation power at that occasion is detected by the radiation power detector 4, 41 (S102). Next, sub carriers used and transmission powers thereof are determined based on a radiation power signal provided from the radiation power detector 4, 41 (S103). Successively, the transmission data is made to be carried by the determined sub carriers and transmitted by the determined transmission powers (S104). When transmission of transmission data has been finished, a signal indicating end of transmission is transmitted to finish a transmission processing (S105).

Figure 13:
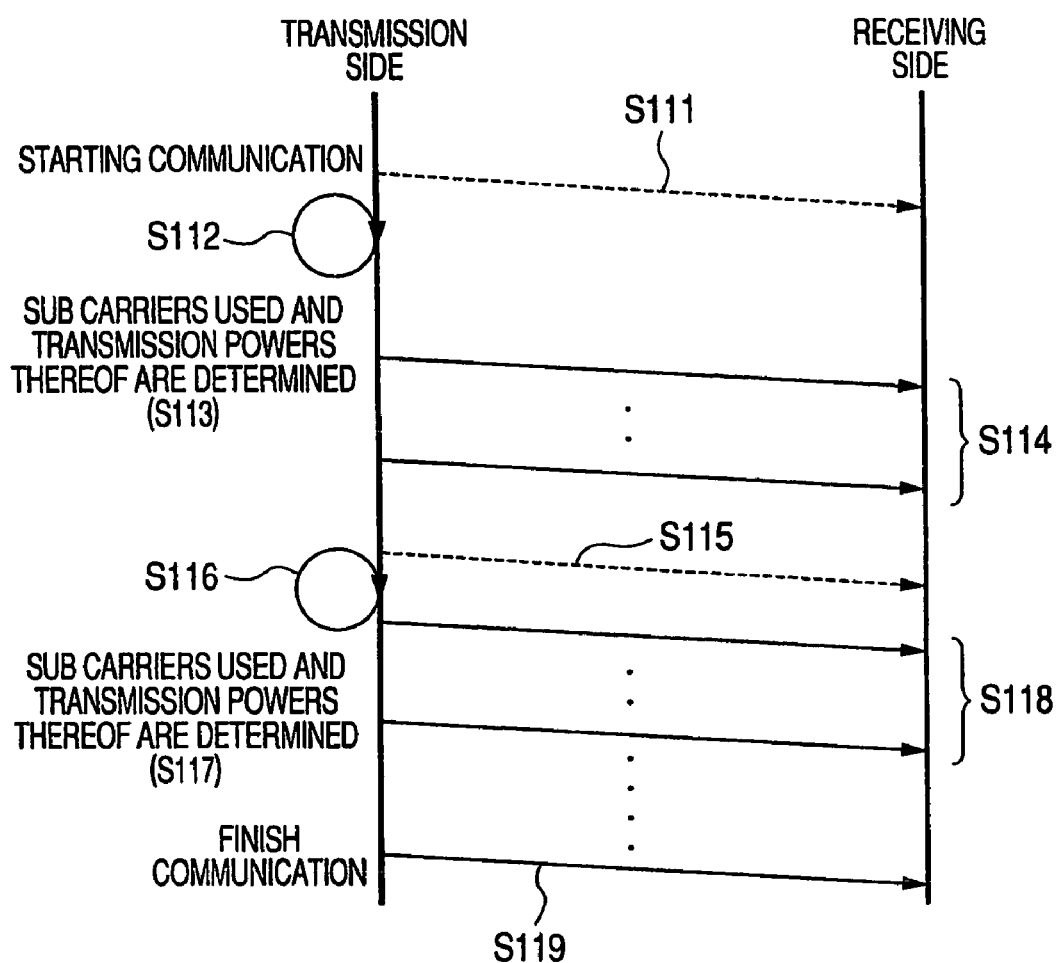
FIG. 13 is a time chart when a radiation power is detected periodically at predetermined intervals in communication.

FIG. 13 is a time chart when a radiation power is detected periodically at predetermined intervals in communication. Similar to FIG. 12, in starting communication, a test frame for detecting a radiation power is transmitted for a constant period of time (S111), and the radiation power at that occasion is detected (S112). Next, sub carriers used and transmission powers thereof are determined based on the provided radiation power signal (S113), transmission data are made to be carried by determined sub carriers and transmitted by the determined transmission powers (S114). When a constant time period has elapsed, there are repeated processings of transmitting the test frame for detecting the radiation power again for the constant period of time (S115), detecting the radiation powers at that occasion (S116) and transmitting transmission data (S118). Further, when transmission of transmission data has been finished, a signal indicating the end of transmission is transmitted to finish the transmission processings (S119).

Although an explanation has been given of a control of the transmission power for the respective sub carriers by the transmission signal controller 2 as described above, the transmission signal controller 2 may control the transmission signal generator 1 to select a modulating system of a sub carrier based on the radiation power signal from the transmission line indicating the radiation power. When the modulating system of the sub carrier is selected, the modulating system of the sub carrier of a frequency in which the radiation power exceeds the predetermined value is changed to a system having a relatively low communication rate. In addition thereto, a modulating system of a sub carrier having a frequency in which a radiation power is sufficiently lower than a predetermined value may be changed to a system having a relatively high communication rate. In this way, by changing the modulating system based on the radiation power signal indicating the radiation power from the transmission line, even when the transmission power of the sub carrier is changed based on the radiation power, a communication in which the communication rate as a whole is not significant reduced can be executed.

Figure 14:
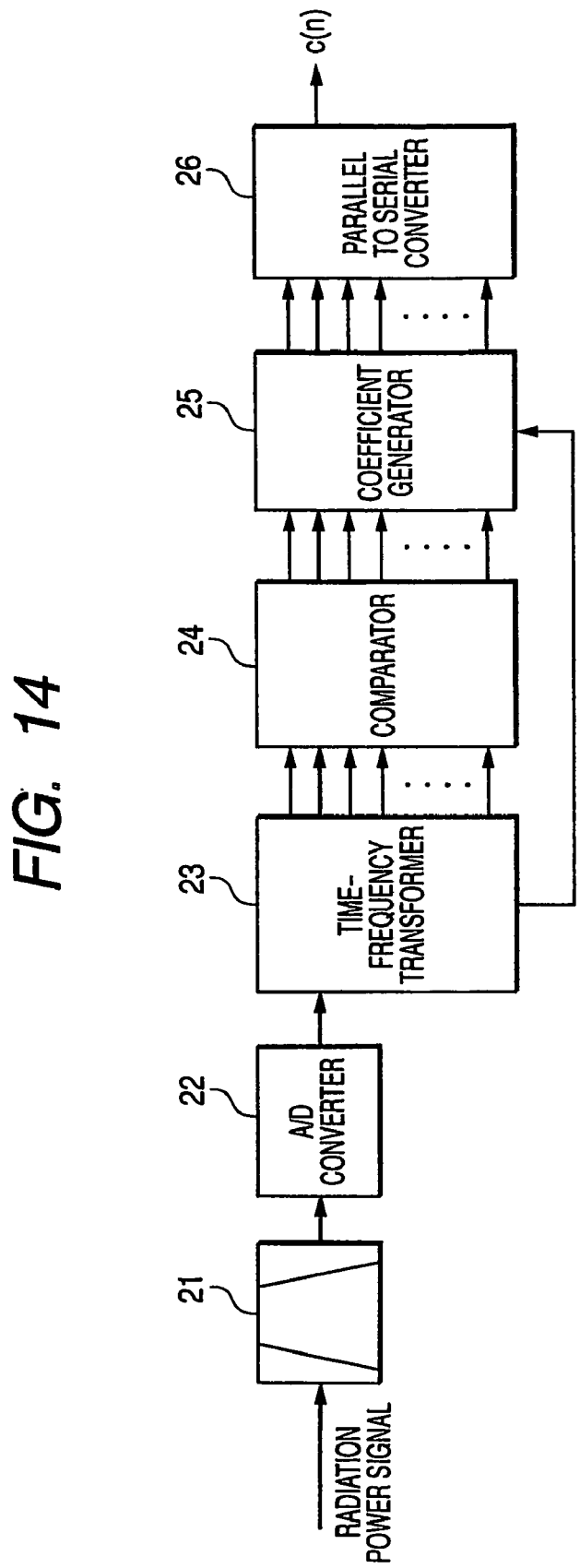
FIG. 14 is a diagram showing an outline structure of an example of a transmission signal controller in a transmission apparatus of an embodiment of the invention.

FIG. 14 shows an outline structure of an example of a transmission signal controller. The transmission signal controller 2 of FIG. 14 generates a power control signal c(n) for controlling transmission powers of respective sub carriers based on a detected radiation power signal and is constituted by including a band pass filter 21, an A/D converter (ADC•IC) 22, a time/frequency transformer 23, a comparator 24, a coefficient generator 25, and a parallel to serial converter (P/S converter) 26. The radiation power detector 4 is constituted by including the band pass filter 21, and the A/D converter 22.

The band pass filter 21 removes a low frequency component and a high frequency component which are not needed included in the radiation power signal and extracts only a component of a frequency band utilized in multi carrier communication, and the component is converted into a digital signal by the A/D converter 22 and is transmitted to the time/frequency transformer 23. The time/frequency transformer 23 generates a frequency spectrum of the inputted digital signal. The comparator 24 compares the generated frequency spectrum with a predetermined reference value for each predetermined frequency band (specifically, for each sub carrier frequency) and outputs a result thereof to the coefficient generator 25.

The coefficient generator 25 generates a compensation signal of each sub carrier based on an output of the comparator 24 and phase data from the time/frequency transformer 23. An output from the coefficient generator 25 converts the compensation signal for each sub carrier into a series signal by the P/S converter 26 to be outputted as the power control signal c (n). Here, notation n designates a number of the sub carrier.

Further, the transmission signal controller shown in FIG. 14 is only an example and a transmission line characteristic, a detector characteristic, or a characteristic of other control system may be compensated for by adding an equalizer thereto. Further, a circuit structure may be simplified without utilizing phase data, and the compensation signal may be changed in steps and the compensation signal may be changed in accordance with an amplitude response thereof.

Figure 15:
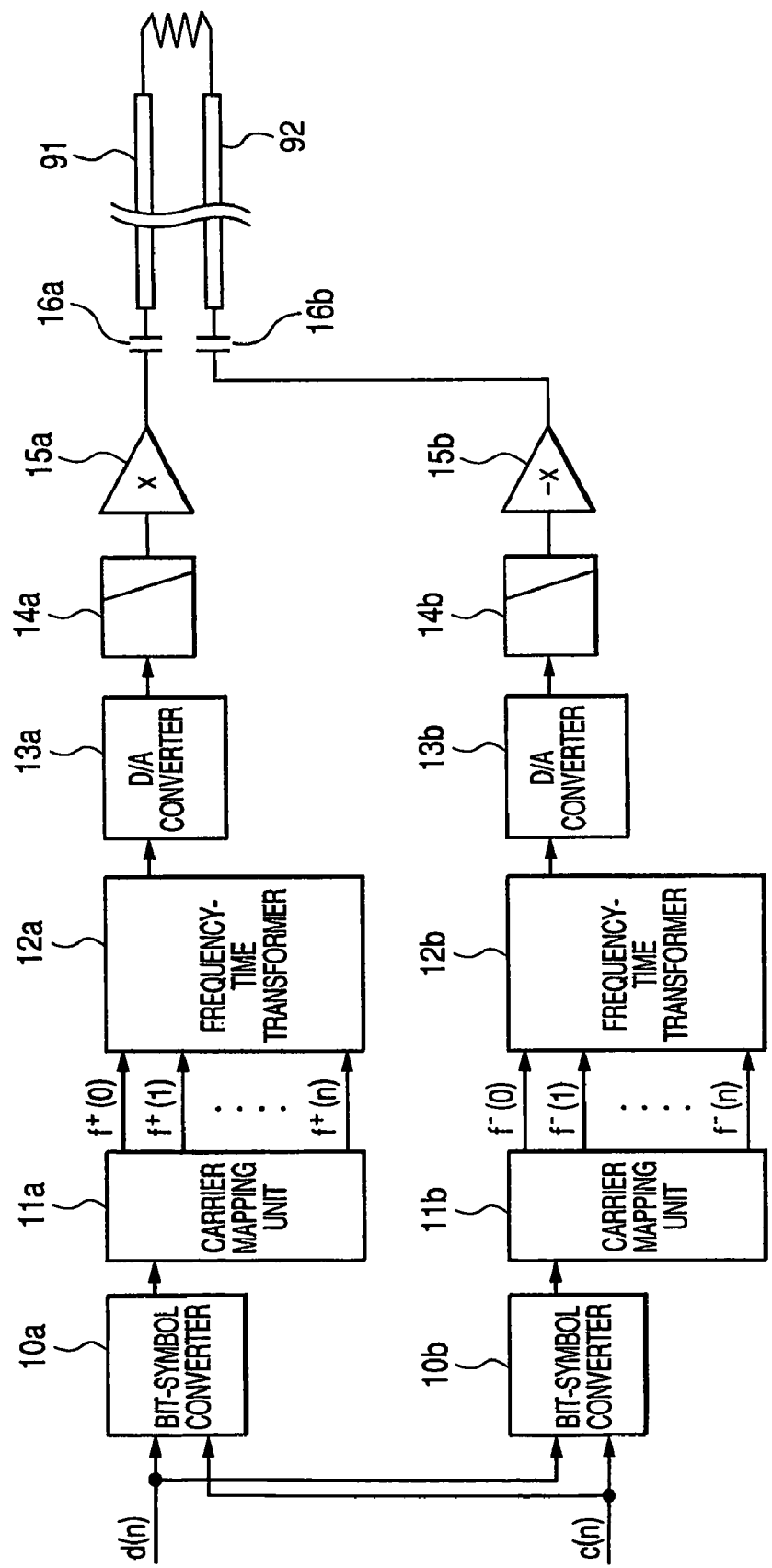
FIG. 15 is a diagram showing an outline structure of an example of a transmission signal generator in a transmission apparatus of an embodiment of the invention.

FIG. 15 shows an outline structure of an example of the transmission signal generator. The transmission signal generator 1 of FIG. 15 generates a balance transmission signal transmitted to transmission lines 91, 92 and is illustrated by including a structure of the transmitter 3. The transmission signal generator of FIG. 15 is constituted by including bit-symbol converters 10a, 10b, carrier mapping units 11a, 11b, frequency-time transformers 12a, 12b, D/A converters 13a, 13b, low pass filters 14a, 14b, amplifiers 15a, 15b, and coupling capacitors 16a, 16b. The respective elements are for respectively generating differential signals for carrying out balance transmission and provided with substantially similar functions. Further, the transmitter 3 is constituted by including the low pass filters 14a, 14b, the amplifiers 15a, 15b, and the coupling capacitors 16a, 16b.

The bit-symbol converters 10a, 10b convert transmission data d(n) based on the power control signal c(n) from the transmission signal controller of FIG. 14 and outputs transmission data in which transmission power is controlled for each sub carrier, and outputs thereof are transmitted to the carrier mapping units 11a, 11b. The carrier mapping units 11a, 11b map signals on a time domain inputted from the bit-symbol converters 10a, 10b and execute primary modulation.

When conversion at the bit-symbol converter 10a is designated by notation A, conversion at the bit-symbol converter 10b is designated by notation B and conversion at the carrier mapping units 11a, 11b is designated by notation F, the bit-symbol converters 10a, 10b execute conversion satisfying [Equation 1] through [Equation 3] shown below. As is apparent from [Equation 1] and [Equation 3], a differential component of conversion data (transmission original data $f^+(n)$, $f^-(n)$) is generated based on the transmission data d(n), and an in-phase component of the conversion data is generated based on the transmission power control signal c(n).

$$|f^+(n)|-|f^-(n)|=|F(A(d(n),c(n)))|-|F(B(d(n),c(n)))|=|F(d(n))| \quad \text{[Equation 1]}$$

$$\angle f^+(n)=\angle F(A(d(n),c(n)))=\angle f^-(n)=\angle F(B(d(n),c(n)))=\angle F(d(n)) \quad \text{[Equation 2]}$$

$$(|f^+(n)|+|f^-(n)|)/2=(|F(A(d(n),c(n)))|-|F(B(d(n),c(n)))|)/2=F(c(n)) \quad \text{[Equation 3]}$$

Outputs of the carrier map unit 11a, 11b are transmitted to the frequency-time transformers 12a, 12b and converted from data on a frequency domain to data on a time domain. The frequency-time transformers 12a, 12b execute, for example, wavelet inverse transformation. Digital data on the time domain outputted from the frequency-time transformers 12a, 12b are converted into analog data by the D/A converters 13a, 13b, removed of high frequency components by the low pass filters 14a, 14b and thereafter inputted to the amplifiers 10a, 10b. The amplifiers 10a, 10b are respectively provided with amplification degrees of 'X', '−X' and output transmission signals to the pair of transmission lines 91, 92 at a predetermined signal level.

In this way, two routes of transmission signals for being transmitted to respectives of the pair of transmission lines are separately generated, further, the transmission signals are controlled to compensate for unbalance of the transmission lines (in correspondence with radiation power signal) and therefore, when the unbalance is detected, the respective transmission signals which are intentionally unbalanced are transmitted. Therefore, the transmission signals received via the unbalanced transmission lines are balanced as a result and the radiation power can be reduced.

Figure 16:
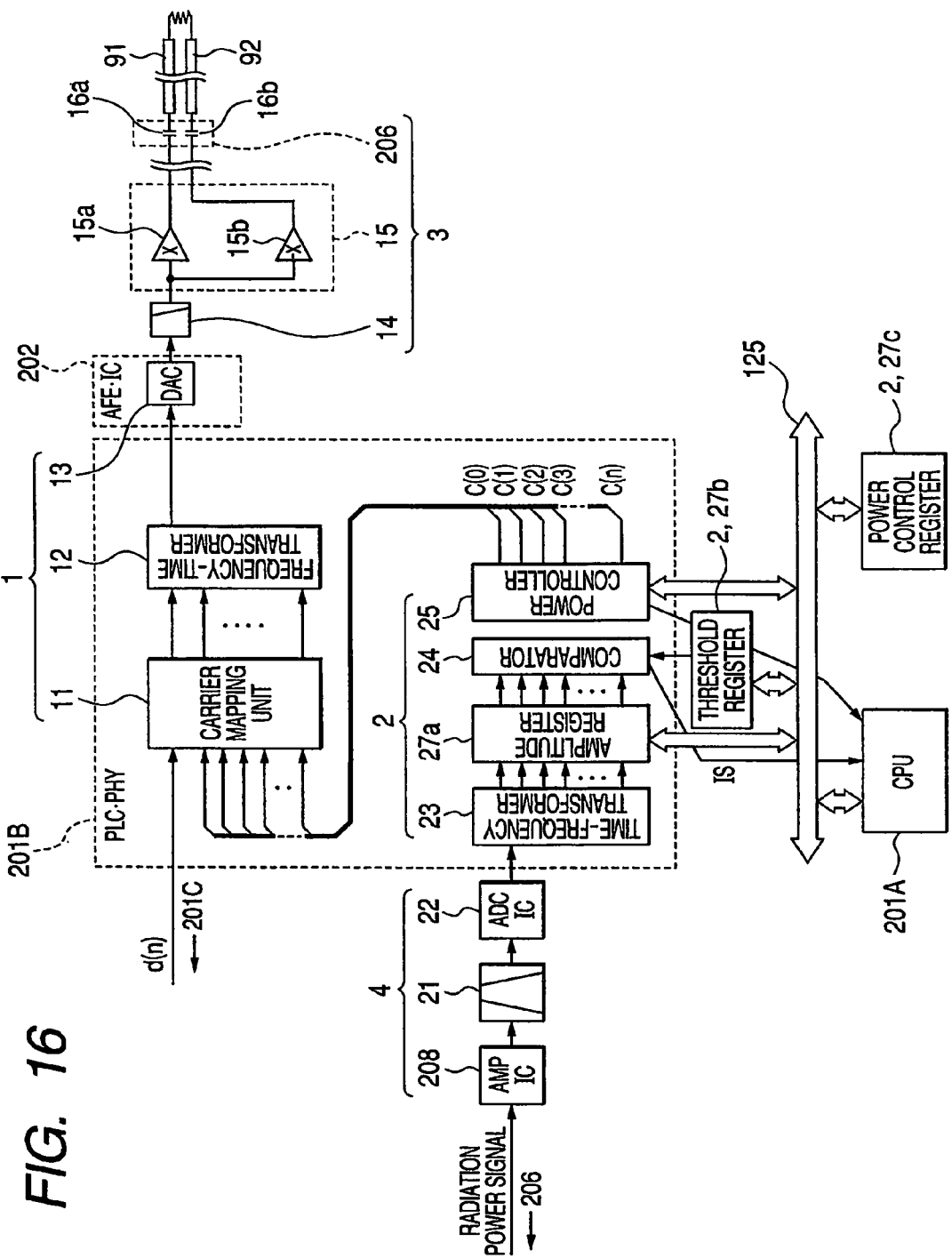
FIG. 16 is a diagram showing a detailed structure of a communication apparatus (a portion thereof) of an embodiment of the invention.

FIG. 16 is a diagram showing a detailed structure of a communication apparatus (a portion thereof) for explaining an embodiment of the invention. A further detailed explanation will be given of a case of reducing radiation power in reference to FIG. 16.

In FIG. 16, the transmission signal generator 1 is constituted by including a carrier mapping portion 11, a frequency-time transformer 12, and a D/A converter 13. The transmission signal controller 2 is constituted by including a frequency-time transformer 23, an amplitude register 27a, a comparator 24, a power controller (coefficient generator) 25, a threshold register 27b, and a power control register 27c. The transmitter 3 is constituted by including the low pass filter 14, the driver IC 15, and the coupler 206. The driver IC 15 includes amplifiers 15$a$, 15$b$. The radiation power detector 4 is constituted by including AMP•IC 208, the band pass filter 21, and ADC•IC 22.

The carrier mapping portion 11 converts a transmission data d(n) constituted by a bit stream data into a symbol data for modulating respective sub carriers. At this occasion, based on the transmission power control signal c(n), mentioned later, transmission powers of respective sub carriers are controlled. That is, the transmission power control signal c(n) indicates an attenuating amount relative to a maximum power and the carrier mapping portion 11 attenuates transmission powers of respective sub carriers in accordance with the transmission power control signal c(n).

An output of the carrier mapping portion 11 is transmitted to the frequency-time transformer 12 to convert data on a frequency domain to data on a time domain. The frequency-time transformer 12 executes, for example, wavelet inverse transformation. Digital data on the time domain outputted by the frequency-time transformer 12 is converted into analog data by the D/A converter 13, removed of the high frequency component by low pass filter 14 thereafter inputted to the amplifiers 15$a$, 15$b$. The amplifiers 15$a$, 15$b$ are respectively provided with gains of 'X', '−X' (that is, amplification degrees in which only positive and negative signs are inverted), and the transmission signal is outputted to the pair of lines 91, 92 at a predetermined signal level by way of the coupling capacitors 16$a$, 16$b$.

A radiation power component is generated at the pair of lines 91, 92 in accordance with a characteristic of the transmission lines. According to the radiation power signal detected by the radiation power detector 4, the receiving level is amplified by AMP•IC 208 and a band component other than the sub carrier band is removed by the band pass filter 21. Further, the component is converted into a digital value by ADC•IC 22. The time-frequency transformer 23 converts the radiation power signal converted into the digital value into an amplitude component in correspondence with each sub carrier frequency to be recorded by the amplitude register 27$a$. The comparator 24 compares values of the amplitude register 27$a$ and the threshold register 27$b$ for each sub carrier and when a sub carrier exceeding the threshold is generated, the comparator 24 generates an interruption signal IS to inform CPU 201A and outputs a difference from the threshold to the power controller 25. CPU 201A detecting the interruption signal IS stops transmitting data and executes operation of reducing the radiation power.

When the operation of reducing the radiation power is started, the power controller 25 calculates the difference between the threshold and the radiation power of each sub carrier from the values of the amplitude register 27$a$ and the threshold register 27$b$ via a data path 125. Further, the difference of the radiation power is subtracted from the value of the power control register 27$c$, and a result thereof is newly recorded in the power control register 27$c$ to update a content thereof. Further, when a result of subtraction becomes a positive value, the result is recorded as 0. The power control register 27$c$ is recorded with the attenuating amount relative to the maximum power of each sub carrier. In starting the transmission signal generator 1, the respective sub carriers are set to an initial value 0 (attenuation amount 0). Thereafter, at each time of generating the sub carrier having the radiation power signal exceeding the threshold, the power control register 27$c$ is updated by constituting a new attenuating amount by the difference from the threshold. With regard to the sub carrier exceeding the threshold, an attenuating amount larger than that in updating at a preceding time is newly set.

Further, conversely, with regard to the sub carrier in which the radiation power is reduced by being caused by a variation in a transmission line condition or the like, a small attenuating amount is newly set. When the operation has been finished, the power control portion 25 generates the interruption signal IS to inform CPU 201A. The power control portion 25 outputs the value of the power control register 27$c$ to the carrier mapping portion 11 as the transmission power control signal c (n).

In this way, the radiation power can effectively be reduced by generating the transmission power control signal c(n) in accordance with the detected radiation power signal and attenuating the transmission power of each sub carrier in which the radiation power exceeds the threshold based on the transmission power control signal c(n).

Further, although in one example of the embodiment, an example of using one radiation power threshold is shown, a structure having a plurality of thresholds can be constructed. For example, when a lower limit threshold indicating a lower limit of the radiation power is provided and even when the radiation power becomes lower than the lower limit threshold, the power control portion 25 is controlled to execute operation, a control of reducing the transmission power attenuating amount can efficiently be executed and the transmission power of each sub carrier can further optimally be controlled.

SECOND EMBODIMENT

Figure 17:
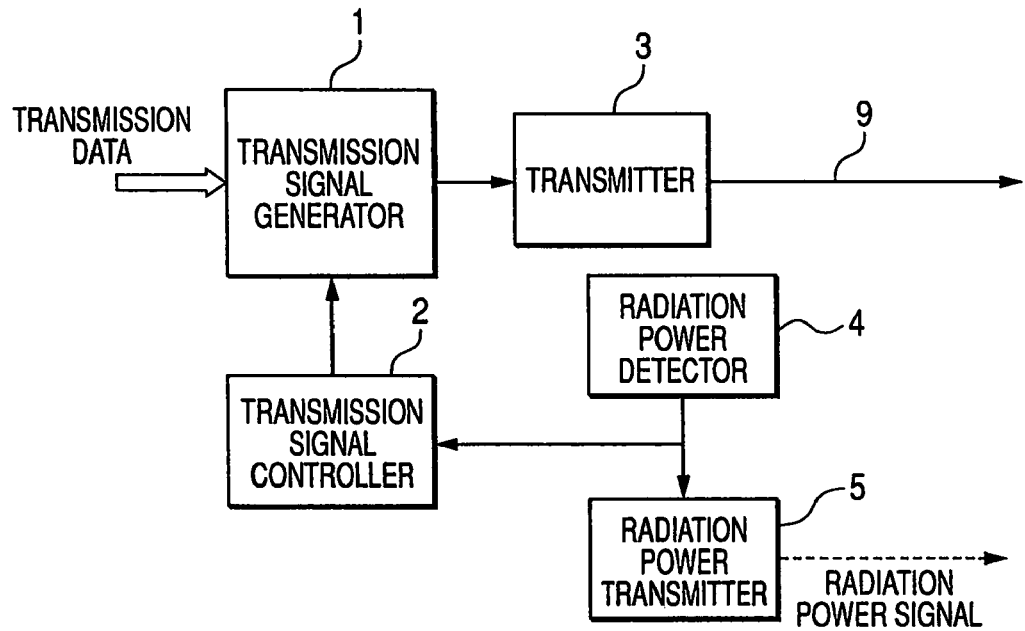
FIG. 17 is a diagram showing an outline structure of a communication apparatus for explaining a second embodiment of the invention.

FIG. 17 shows an outline structure of a communication apparatus for explaining a second embodiment of the invention. The communication apparatus of FIG. 17 is constituted by including the transmission signal generator 1, the transmission signal controller 2, the transmitter 3, the radiation power detector 4, and a radiation power transmitter 5. The communication apparatus is the same as the communication apparatus of FIG. 5 except that the radiation power transmitter 5 is provided and therefore, an explanation of elements other than the radiation power transmitter 5 will be omitted.

The radiation power transmitter 5 is for transmitting the radiation power signal provided from the radiation power detector 4 to other communication apparatus. It is preferable that a timing for transmitting the radiation power signal is the timing of detecting the radiation power by the radiation power detector 4 as has been explained in reference to FIG. 12 or FIG. 13. Further, although in FIG. 17, the radiation power signal to be transmitted is conceptually designated by a broken line arrow mark, actually, the radiation power signal is transmitted via the transmission signal generator 1, the transmitter 3, and the transmission line 9 as transmission data.

When the communication apparatus having the radiation power transmitter 5 is provided in this way, the communication system can be simplified. That is, by the communication apparatus having the radiation power transmitter 5, the radiation characteristic of the transmission line of the wired communication system to which the communication apparatus belongs can be transmitted to other communication apparatus and therefore, the other communication apparatus can execute communication with inconsiderable quality deterioration without detecting the radiation power. Particularly, in communication at an area of using indoor power wirings in which communication or the like is limited, even when the same radiation power signal is utilized, a sufficient effect can be expected and therefore, it is not necessary to provide all of communication apparatus with means for detecting the radiation power, and the communication system can be constructed by utilizing the communication apparatus having a simple structure. Further, although the communication apparatus of FIG. 17 is provided with the radiation power detector 4 for directly detecting power of transmission power radiated from the transmission line 9, similar to the communication apparatus of FIG. 6, the radiation power detector 41 for indirectly detecting the radiation power may be provided.

THIRD EMBODIMENT

Figure 18:
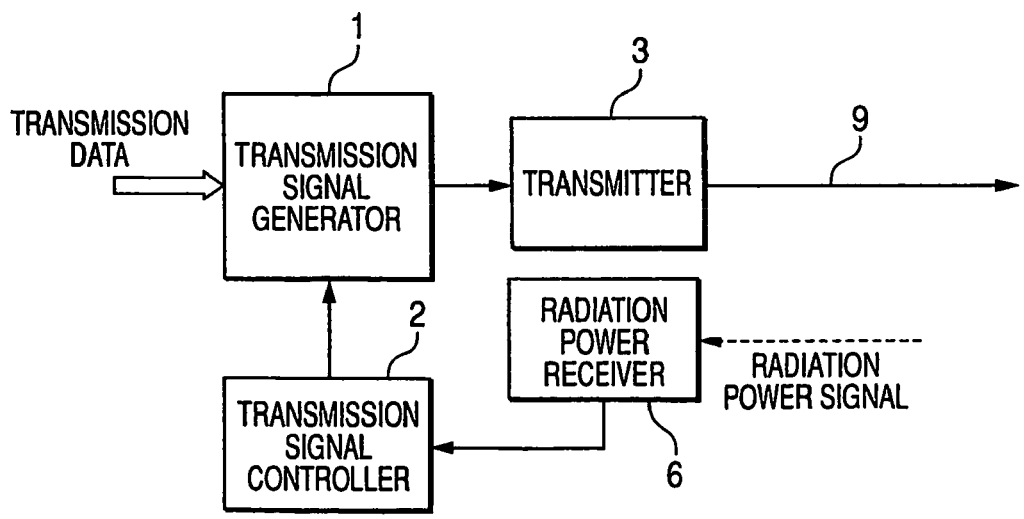
FIG. 18 is a diagram showing an outline structure of a communication apparatus for explaining a third embodiment of the invention.

FIG. 18 shows an outline structure of a communication apparatus for explaining a third embodiment of the invention. The communication apparatus of FIG. 18 is constituted by including the transmission signal generator 1, the transmission signal controller 2, the transmitter 3, and a radiation power receiver 6. The communication apparatus is the same as the communication apparatus of FIG. 5 except that the radiation power detector 4 is removed and the radiation power receiver 6 is provided and therefore, an explanation of elements other than the radiation power receiver 6 will be omitted.

The radiation power receiver 6 receives the radiation power signal from outside and received radiation power signal is transmitted to the transmission signal controller 2 and is utilized for control of the transmission signal generator 1. The received radiation power signal is transmitted from other communication apparatus, for example, the communication apparatus shown by FIG. 5, FIG. 6, FIG. 17, and is the radiation power signal from the transmission line connected with the communication apparatus of FIG. 18 or the transmission line constituting the same communication system. Further, although in FIG. 18, the received radiation power signal is conceptually designated by a broken line arrow mark, actually, the radiation power signal is received via receiving means, not illustrated, via the transmission line 9.

FOURTH EMBODIMENT

Figure 19:
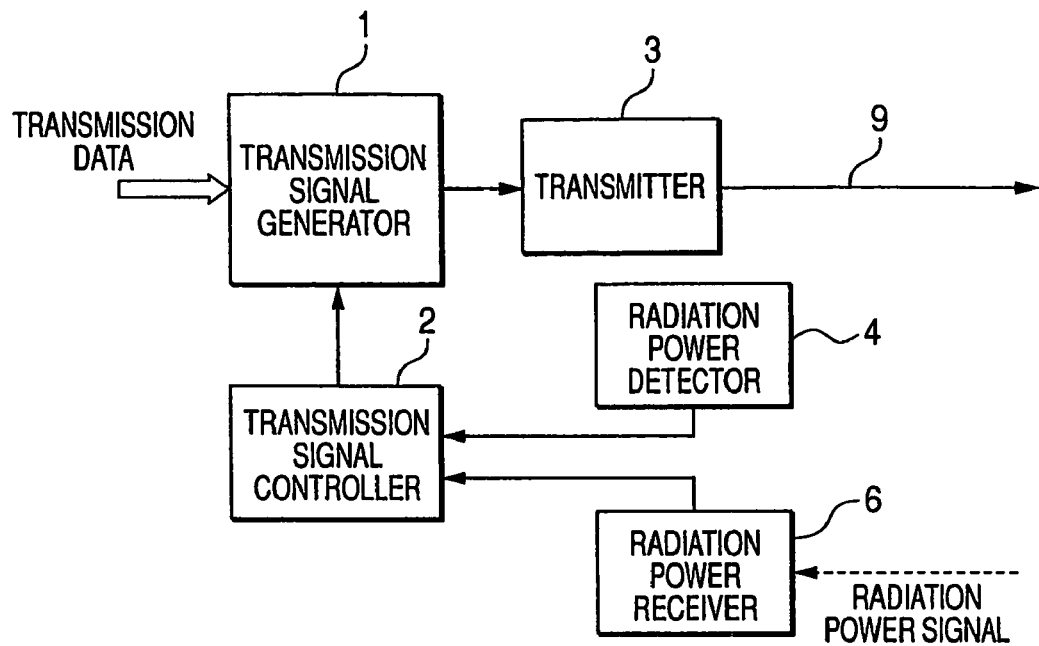
FIG. 19 is a diagram showing an outline structure of a communication apparatus for explaining a fourth embodiment of the invention.

FIG. 19 shows an outline structure of a communication apparatus for explaining a fourth embodiment of the invention. The communication apparatus of FIG. 19 is constituted by including the transmission signal generator 1, the transmission signal controller 2, the transmitter 3, the radiation power detector 4, and the radiation power receiver 6. The communication apparatus is the same as the communication apparatus of FIG. 5 except that the radiation power receiver 6 is provided. Further, the radiation power receiver 6 is similar to that provided in the communication apparatus of FIG. 18.

According to the communication apparatus of FIG. 19, the radiation power signal is provided from both of the radiation power detector 4 and the radiation power receiver 6. The transmission signal controller 2 may select to use either one of the radiation power signals, or may use both of the radiation power signals. When both of the radiation power signals are used, for example, it is preferable that a value of the radiation power signal having higher radiation power is made to constitute the radiation power signal of a frequency band of a sub carrier thereof.

Further, also in the communication apparatus of FIG. 19, in place of the radiation power detector 4, the radiation power detector 41 for indirectly detecting the radiation power as shown by FIG. 6 can be utilized. Further, similar to the communication apparatus of FIG. 17, the radiation power transmitter 5 for transmitting the radiation power signal provided from the radiation power detector 4 or 41 to other communication apparatus may also be added.

FIFTH EMBODIMENT

Figure 20:
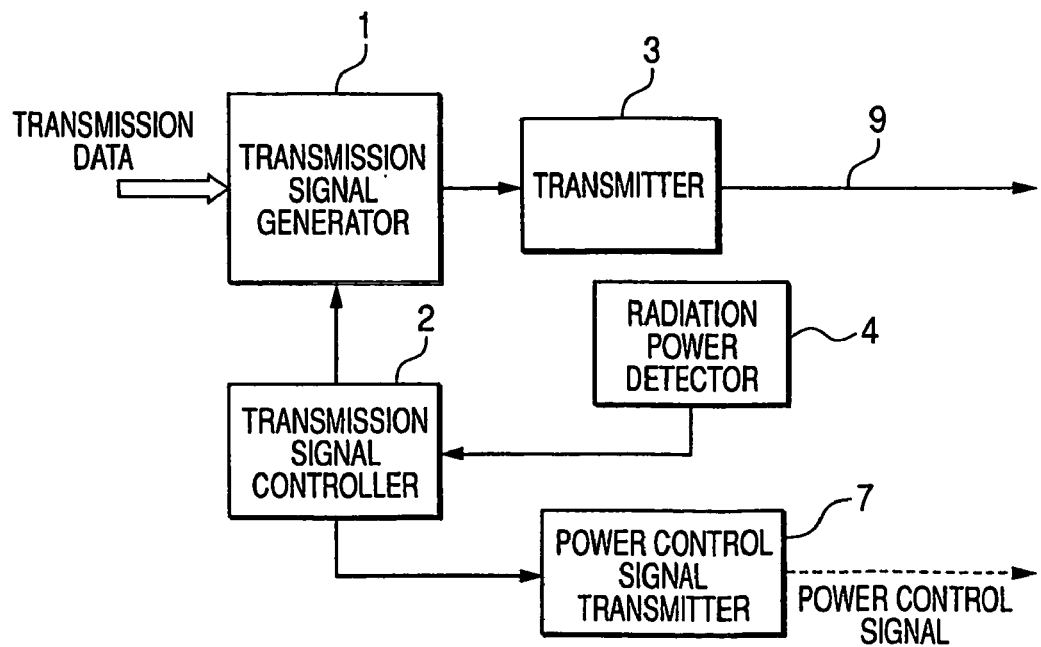
FIG. 20 is a diagram showing an outline structure of a communication apparatus for explaining a fifth embodiment of the invention.

FIG. 20 shows an outline structure of a communication apparatus for explaining a fifth embodiment of the invention. The communication apparatus of FIG. 20 is constituted by including the transmission signal generator 1, the transmission signal controller 2, the transmitter 3, the radiation power detector 4, and a power control signal transmitter 7. The communication apparatus is the same as the communication apparatus of FIG. 5 except that the power control signal transmitter 7 is provided and therefore, an explanation of elements other than the power control signal transmitter 7 will be omitted.

The power control signal transmitter 7 transmits the power control signal calculated by the transmission signal controller 2 to other communication apparatus. The transmission signal controller 2 calculates the power control signal based on the radiation power signal provided from the radiation power detector 4. It is preferable that a timing of transmission is the timing of detecting the radiation power by the radiation power detector 4 as has been explained in reference to FIG. 12 or FIG. 13. Further, although in FIG. 20, the power control signal to be transmitted is conceptually designated by a broken line arrow mark, actually, the power control signal is transmitted via the transmission signal generator 1, the transmitter 3, the transmission line 9 as transmission data. Further, although the communication apparatus of FIG. 20 is provided with the radiation power detector 4 for directly detecting power of transmission power radiated from the transmission line 9, similar to the communication apparatus of FIG. 6, the radiation power detector may be constituted by the radiation power detector 41 for indirectly detecting the radiation power.

Figure 21:
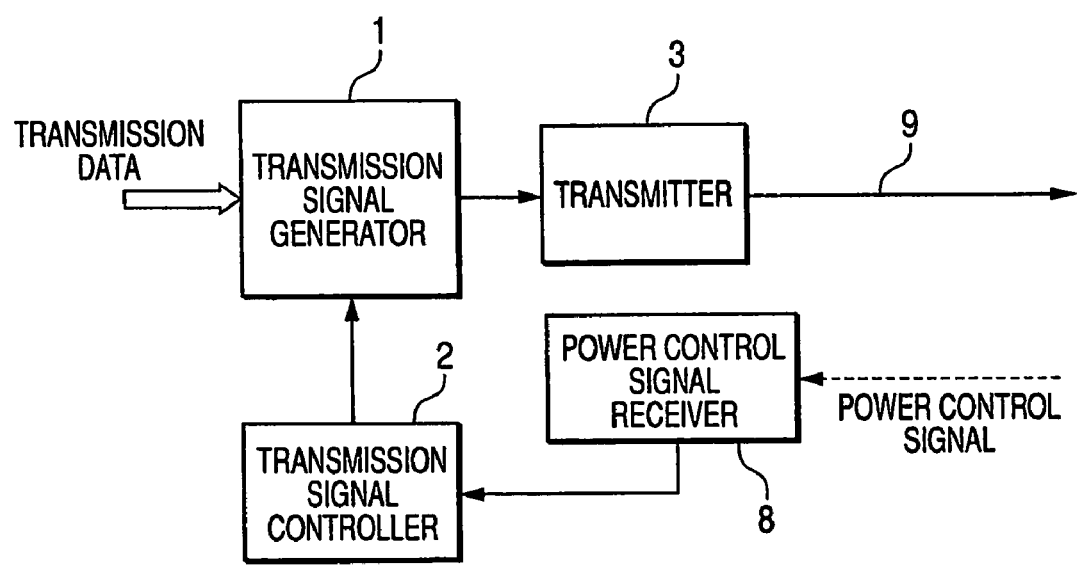
FIG. 21 is a diagram showing an outline structure of a communication apparatus utilized in a communication system having the communication apparatus for explaining the fifth embodiment of the invention.

When a communication system having the power control signal transmitter 7 is constructed, by using the communication apparatus as shown by FIG. 21 as other communication apparatus, the system is simplified. The communication apparatus of FIG. 21 is constituted by including the transmission signal generator 1, the transmission signal controller 2, the transmitter 3, and a power control signal receiver 8. The communication apparatus is the same as the communication apparatus of FIG. 5 except that the radiation power detector 4 is removed and the power control signal receiver 8 is provided and therefore, an explanation of elements other than the power control signal receiver 8 will be omitted.

The power control signal receiver 8 receives the power control signal from the communication apparatus according to the fifth embodiment as shown by FIG. 20 and the received power control signal is transmitted to the transmission signal controller 2 and is utilized for control of the transmission signal generator 1. Further, although in FIG. 21, the received power control signal is conceptually designated by a broken line arrow mark, actually, the power control signal is received via receiving means, not illustrated, via the transmission line 9.

When a communication system is constituted by connecting the communication apparatus according to the fifth embodiment as shown by FIG. 20 and the communication apparatus as shown by FIG. 21 by a wired transmission line in this way, the transmission power control signal calculated by the communication apparatus according to the fifth embodiment can also be utilized by other communication apparatus and therefore, the communication apparatus in which an influence by the radiation power is inconsiderable and a quality deterioration is inconsiderable can simply be constructed.

SIXTH EMBODIMENT

Figure 22:
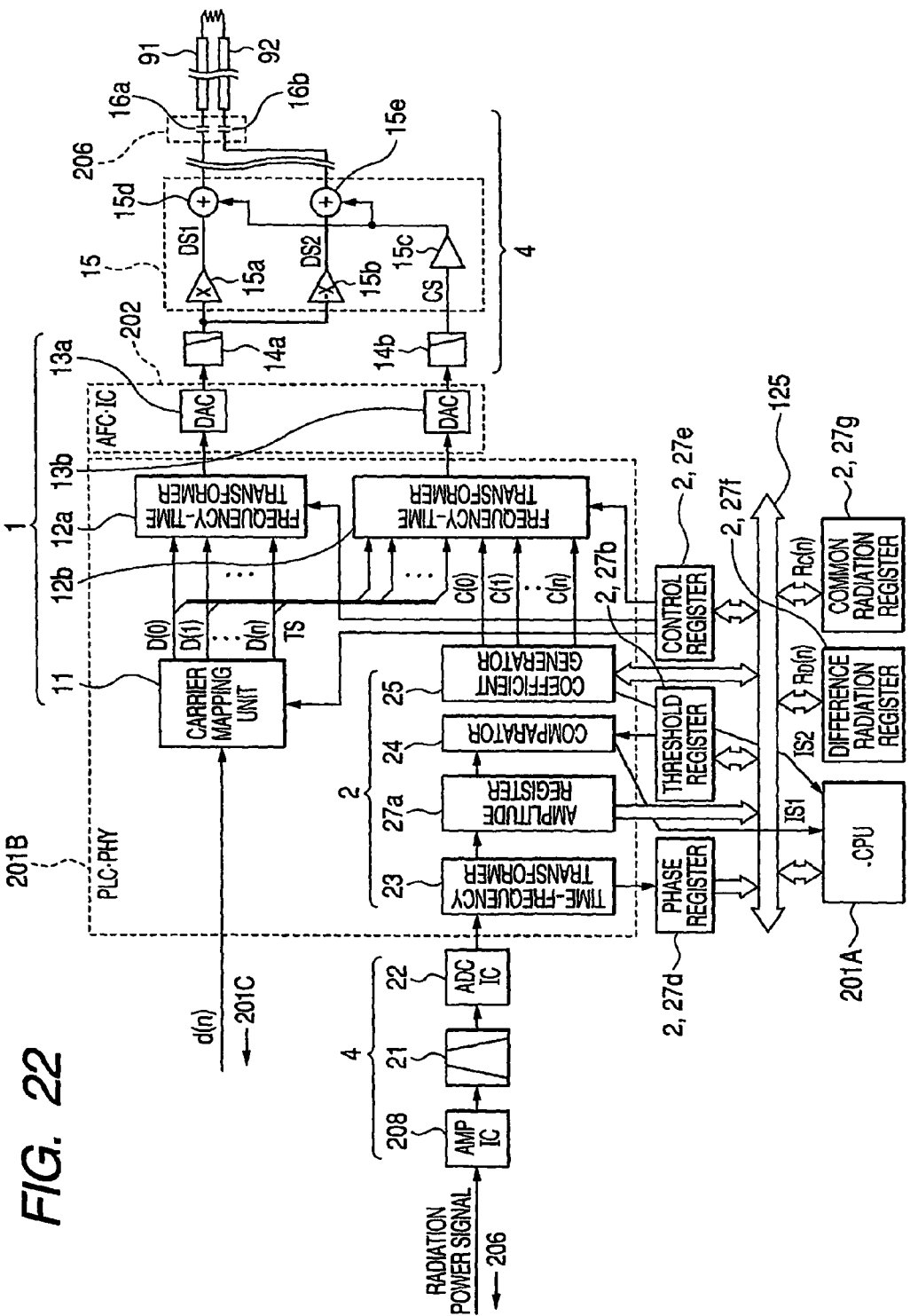
FIG. 22 is a diagram showing a detailed structure of a communication apparatus (a portion thereof) for explaining a sixth embodiment of the invention.

FIG. 22 is a diagram showing a detailed structure of a communication apparatus (a portion thereof) for explaining a sixth embodiment of the invention. An explanation will be given of a case of reducing radiation power by controlling a common signal power component of each sub carrier in reference to FIG. 22.

In FIG. 22, the transmission signal generator 1 is constituted by including the carrier mapping portion 11, frequency-time transformers 12a, 12b, and D/A converters 13a, 13b. The transmission signal controller 2 is constituted by including the time-frequency transformer 23, the amplitude register 27a, the comparator 24, a coefficient generator 25, the threshold register 27b, a phase register 27d, a control register 27e, a difference radiation register 27f, and a common radiation register 27g. The transmitter 3 is constituted by including low pass filters 24a, 24b, a driver IC 15 and the coupler 206. The driver IC 15 includes amplifiers 15a, 15b, 15c, and adders 15d,b 15e. The radiation power detector 4 is constituted by including AMP•IC 208, the band pass filter 21, and ADC•IC 22.

The carrier mapping portion 11 converts the transmission data d(n) constituted by a bit row into a symbol row for converting respective sub carriers. An output of the carrier mapping portion 11 is transmitted to the frequency-time converter 12a to be converted from data on the frequency domain to data on the time domain. D/A converter 13a converts the digital signal into the analog signal. The low pass filter 14a removes the high frequency component equal to or higher than a Nyquist frequency. The amplifiers 15a, 15b amplify the analog signals respectively by predetermined gains X and –X to convert into difference signals DS1, DS2. The adders 15d, 15e superpose a common mode signal CS on the difference signals DS1, DS2 to transmit to the pair of lines 91, 92 via coupling capacitors 16a, 16b.

At the pair of lines 91, 92, the radiation power component is generated in accordance with the characteristic of the transmission lines. According to the radiation power signal detected by the radiation detector 4, the receiving level is amplified by AMP•IC 208 and the band component other than the sub carrier band is removed by the band pass filer 21. Further, the radiation power signal is converted into the digital value by ADC•IC 22. The time-frequency transformer 23 converts the radiation power signal converted into the digital value into an amplitude component and a phase component in correspondence with each sub carrier frequency to record to the amplitude register 27a and the phase register 27d. The comparator 24 compares the values of the amplitude register 27a and the threshold register 27b for each sub carrier and when a sub carrier exceeding the threshold is generated, the comparator 24 generates an interruption signal IS1 to inform CPU 201A.

CPU 201A detecting the interruption signal IS1 stops transmitting data and executes operation of reducing the radiation power. First, CPU 201A controls the control register 27e via the buss 125 and generates a test signal TS for measuring the characteristic of the line from the carrier mapping unit 11. The carrier mapping unit 11 includes a circuit for generating the test signal TS (not illustrated). Although it is preferable to provide a pattern for constituting all of sub carriers by the same power in the test signal TS, the test signal is not limited thereto so far as the test signal is constituted by a known power value.

CPU 201A controls the control register 27e to stop the frequency-time transformer 12b and operates only the frequency-time converter 12a. Thereby, only difference signals DS1, DS2 are transmitted to the pair of lines 91, 92. CPU 201A needs phase data and amplitude data of a radiation power generated when only the difference signals DS1, DS2 are transmitted respectively from the phase register 27d and the amplitude register 27a to record to the difference radiation register 27f.

Next, CPU 201A controls the control register 27e to stop the frequency-time transformer 12a and operates only the frequency-time transformer 12b. At this occasion, CPU 201A controls such that all of the transmission power control signal c(n) becomes null. Thereby, only the common phase signal CS is transmitted to the pair of lines 91, 92. At this occasion, phase data and amplitude data of the generated radiation power are respectively read from the phase register 27d and the amplitude register 27a to record to the common radiation register 27g.

Next, operation of the coefficient generator 25 will be explained. Here, when a response of a radiation power component (hereinafter, referred to as Rd(n)) generated with regard to the difference signals DS1, DS2 (hereinafter, referred to as dif(n)) is defined as a difference radiation response Hd(n), [Equation 4] is established. Further, when a radiation power component (hereinafter, referred to as Rc(n)) generated with regard to the common signal CS (hereinafter, referred to as com(n)) is defined as a common radiation response Hc(n), [Equation 5] is established.

A radiation power component R(n) of the pair of lines 91, 92 becomes a sum of Rd(n) and Rc(n) as shown by [Equation 6] and therefore, by satisfying a condition shown in [Equation 7], the radiation power components of the pair of lines 91, 92 can be cancelled by each other. [Equation 6] can be modified to [Equation 8] from [Equation 4] and [Equation 5]. According to the invention, the common signal com(n) is generated as shown by [Equation 9] and the transmission power control signal c(n) is generated as shown by [Equation 10] from the difference signal dif(n) and the transmission power control signal c(n). Thereby, the condition of [Equation 7] is satisfied and the radiation power components R(n) are cancelled by each other to null.

That is, when the data of the difference radiation register 27f and the data of the common radiation register 27g acquired by transmitting the test signal TS for measuring the line characteristic twice after generating the interruption signal IS1, are respectively defined as Rd(n) and Rc(n), the datas are responses to the same signal and therefore, by executing operation of [Equation 11], the transmission power control signal c(n) can be calculated.

The coefficient generator 25 executes operation by using data of the difference radiation register 27f and data of the common radiation register 27g to calculate the transmission power control signal c(n) and generates the interruption signal IS2 after finishing the operation. CPU 201A returns to normal communication operation after generating the interruption signal IS2. The frequency-time transformer 12b generates the common signal com(n) in correspondence with [Equation 9] for each sub carrier by using the calculated transmission power control signal c(n). That is, CPU 201A outputs a signal outputted by the frequency-time converter 12a in which the amplitude is multiplied by |C(n)| and the phase is moved by an deviation angle of C(n) to each sub carrier component. The outputted signal is converted into the analog value by the D/A converter 13b, removed of the high frequency component equal to or higher than the Nyquist frequency by the low pass filter 14b, provided with a predetermined gain by the amplifier 15c and is superposed on the difference signal by the adder 15d, 15e.

By controlling in this way, the radiation power component generated by the transmission data constituting the difference signal and the common power signal having the same amplitude and the inverted phase are superposed so that the radiation power component and the common power signal are cancelled by each other on the pair of lines 91, 92. Thereby, the radiation power can effectively be reduced. The difference signal component can only reduce the radiation power without being changed in either of procedures of superposing and canceling and without effecting an influence on inherent transmission data power.

$$Rd(n) = dif(n) \cdot Hd(n) \quad \text{[Equation 4]}$$

$$Rc(n) = com(n) \cdot Hc(n) \quad \text{[Equation 5]}$$

$$R(n) = Rd(n) + Rc(n) \quad \text{[Equation 6]}$$

$$Rc(n) = -Rd(n) \quad \text{[Equation 7]}$$

$$R(n) = dif(n) \cdot Hd(n) + com(n) \cdot Hc(n) \quad \text{[Equation 8]}$$

$$com(n) = C(n) \cdot dif(n) \quad \text{[Equation 9]}$$

$$C(n) = -\frac{Hd(n)}{Hc(n)} \quad \text{[Equation 10]}$$

$$C(n) = -\frac{Rd(n)}{Rc(n)} \quad \text{[Equation 11]}$$

(Structure of Communication System)

A communication system in which an influence by the radiation power of the transmission line is inconsiderable can be constructed by connecting communication apparatus pertinently selected from the communication apparatus according to the first through the sixth embodiments by a wired transmission line.

At that occasion, when the communication apparatus according to the third embodiment is adopted, at least one set of the communication apparatus having the radiation power transmitter 5 as shown by the second embodiment is provided. For example, the communication system is constituted by using one set of the communication apparatus according to the second embodiment shown in FIG. 17 and the communication apparatus according to the third embodiment shown in FIG. 18. Further, when a communication system provided with a communication apparatus having the power control signal transmitter 7 as shown by the fifth embodiment is constructed, the communication system is constructed by one set of a communication apparatus having the power control signal transmitter 7 and the communication apparatus having the power control signal receiver 8 as shown by FIG. 21 as a remaining communication apparatus.

When the communication system is constituted by using the communication apparatus having the radiation power transmitter 5 or the power control signal transmitter 7 in this way, a structure of other communication apparatus can be simplified to thereby provide the communication system having a simple structure as a whole.

On the other hand, when a communication system is constructed only by the communication apparatus according to the first embodiment, a communication system capable of reducing the influence by the radiation power of the transmission line can be constructed without transmitting or receiving the radiation power signal.

This application is based on Japanese Patent Application No. 2004-157240 filed on May 27, 2004, which is incorporated herein by reference.

INDUSTRIAL APPLICABILITY

The invention provides a communication apparatus, a communication system and a communication method enabling efficient transmission in accordance with a situation of a wired transmission line and is useful for reducing an influence by a radiation power of the transmission line.

The invention claimed is:

1. A communication apparatus for executing a wired communication using a plurality of sub carriers, said apparatus comprising:
   a transmission signal generator for generating first and second transmission signals;
   a transmitter for transmitting the first transmission signal generated by the transmission signal generator; and
   a transmission signal controller for controlling a transmission power of the second transmission signal generated by the transmission signal generator based on a radiation power in a transmission line in correspondence with a frequency of the sub carrier of the first transmission signal generated by the transmission signal generator,
   wherein the transmitter transmits the second transmission signal the transmission power of which is controlled by the transmission signal controller via the transmission line,
   wherein the transmission signal controller reduces the transmission power of the sub carrier of the frequency in which the radiation power exceeds a predetermined value, and
   wherein the transmission signal controller intermittently changes the transmission power of the sub carrier of the frequency in which the radiation power exceeds the predetermined value.

2. The communication apparatus according to claim 1, wherein the transmission signal controller selects a modulation system of the sub carrier based on a indicating the radiation power from the transmission line.

3. The communication apparatus according to claim 2, wherein the transmission signal controller changes the modulation system of the sub carrier of the frequency in which the radiation power exceeds the predetermined value to a modulation system having a relatively low communication rate.

4. The communication apparatus according to claim 1, wherein the transmission line utilizes a pair of lines, and the transmission signal generator generates the first and second transmission signals transmitted to the pair of lines for each sub carrier and each transmission line based on a transmission data and the radiation power.

5. The communication apparatus according to claim 4, wherein the transmission signal generator generates a differential component of the second transmission signal based on the transmission data and generates a common component of the second transmission signal based on the radiation power.

6. The communication apparatus according to claim 5, wherein the common component is generated such that the radiation power is reduced.

7. The communication apparatus according to claim 6, wherein the radiation power includes a radiation power component when a predetermined test signal is transmitted to the transmission line as the differential signal and a radiation power component when the predetermined test signal is transmitted to the transmission line as a common mode signal.

8. The communication apparatus according to claim 1, further comprising:
   a radiation power detector for directly detecting the radiation power.

9. The communication apparatus according to claim 8, further comprising:
a radiation power transmitter for transmitting the radiation power signal indicating the radiation power detected by the radiation power detector to other communication apparatus.

10. The communication apparatus according to claim 8, further comprising:
a power control signal transmitter for transmitting a power control signal calculated based on the detected radiation power for controlling the transmission power of the sub carrier to other communication apparatus.

11. A communication system comprising a plurality of communication apparatus connected via a wired transmission line, wherein one communication apparatus out of the plurality of communication apparatus is the communication apparatus according to claim 10 for transmitting the power control signal to all of remaining communication apparatus out of the plurality of communication apparatus; and
wherein the remaining communication apparatus control the transmission power of the sub carrier based on the transmission power control signal received from the one communication apparatus.

12. The communication apparatus according to claim 1, wherein the wired transmission utilizes a pair of lines, further comprising:
a radiation power detector for indirectly detecting a signal of the radiation power by utilizing signals transmitted through the pair of lines.

13. The communication apparatus according to claim 12, wherein the radiation power detector detects an unbalance component of the signals transmitted through the pair of lines.

14. The communication apparatus according to claim 1, further comprising:
a radiation power receiver for receiving a radiation power signal indicating the radiation power from outside.

15. The communication apparatus according to claim 1, wherein the transmission signal controller intermittently makes the transmission powers of all of the sub carriers constant and utilizes the radiation power signal at that occasion for controlling the second transmission signal.

16. The communication apparatus according to claim 1, wherein the radiation power signal indicating the radiation power is acquired only once in starting communication.

17. The communication apparatus according to claim 1, wherein the radiation power signal indicating the radiation power is acquired periodically.

18. The communication apparatus according to claim 1, wherein the transmission line is a power line.

19. The communication apparatus according to claim 1, wherein the wired transmission is a transmission of an OFDM system.

20. The communication apparatus according to claim 19, wherein the wired transmission is the transmission of the OFDM system using a wavelet transformation.

21. A communication system comprising a plurality of communication apparatus connected via a wired transmission line, wherein one communication apparatus out of the plurality of communication apparatus is the communication apparatus according to claim 1 for transmitting the detected radiation power signal indicating the detected radiation power to all of remaining communication apparatus out of the plurality of communication apparatus,
wherein the one communication apparatus further includes a radiation power detector for directly detecting the radiation power and a radiation power transmitter for transmitting the radiation power signal indicating the radiation power detected by the radiation power detector to other communication apparatus,
wherein the remaining communication apparatus are the communication apparatus according to claim 1 for controlling the transmission power of the sub carrier based on the radiation power signal received from the one communication apparatus, and
wherein the remaining communication apparatus further includes a radiation power receiver for receiving a radiation power signal indicating the radiation power from outside.

22. The communication apparatus according to claim 1, wherein the first and second transmission signals includes data which is normally transmitted via the transmission line.

23. A communication apparatus for executing a wired communication using a plurality of sub carriers, said apparatus comprising:
a transmission signal generator for generating first and second transmission signals;
a transmitter for transmitting the first transmission signal generated by the transmission signal generator; and
a transmission signal controller for controlling a transmission power of the second transmission signal generated by the transmission signal generator based on a radiation power in a transmission line in correspondence with a frequency of the sub carrier of the first transmission signal generated by the transmission signal generator,
wherein the transmitter transmits the second transmission signal the transmission power of which is controlled b the transmission signal controller via the transmission line,
wherein the transmission signal controller reduces the transmission power of the sub carrier of the frequency in which the radiation power exceeds a predetermined value,
wherein the transmission line utilizes a pair of lines, and the transmission signal generator generates the first and second transmission signals transmitted to the pair of lines for each sub carrier and each transmission line based on a transmission data and the radiation power,
wherein the transmission signal controller includes a time-frequency transformer for converting a radiation power signal indicating the radiation power into a frequency component, a comparator for comparing respectives of the frequency component with a predetermined comparison value and outputting a comparison result, a coefficient generator for generating a predetermined coefficient in accordance with an output of the comparator, and a parallel to serial converter for converting the coefficient outputted from the coefficient generator in parallel into a series coefficient data; and
wherein the transmission signal generator includes a first data converter and a second data converter for outputting a first transmission original data for providing the second transmission signal transmitted to one of the pair of lines and outputting a second transmission original data for providing the second transmission signal transmitted to other of the pair of lines by converting the transmission data based on the series coefficient data.

24. The communication apparatus according to claim 23, wherein the common component of the second transmission signal based on respectives of the first transmission original data and the second transmission original data is a signal for canceling the radiation power signal.

25. A communication method for executing a wired transmission by using a plurality of sub carriers, said method comprising:

(a) generating first and second transmission signals;
(b) transmitting the first transmission signal from a transmitter;
(c) controlling a transmission power of the second transmission signal based on a radiation power in a transmission line in correspondence with a frequency of the sub carrier of the first transmission signal; and
(d) transmitting the second transmission signal the transmission power of which is controlled via the transmission line, wherein:

step (b) further comprises transmitting the second transmission signal, step (c) further comprises (i) controlling the transmission power of the second transmission signal via the transmission line, (ii) reducing the transmission power of the sub carrier of the frequency in which the radiation power exceeds a predetermined value, and (iii) intermittently changing the transmission power of the sub carrier of the frequency in which the radiation power exceeds the predetermined value.

* * * * *